US006114691A

United States Patent [19]

Cousins

[11] Patent Number: 6,114,691

[45] Date of Patent: Sep. 5, 2000

[54] RF-ONLY MASS SPECTROMETER WITH AUXILIARY EXCITATION

[75] Inventor: Lisa Cousins, Toronto, Canada

[73] Assignee: MDS Inc., Etobicoke, Canada

[21] Appl. No.: 09/071,934

[22] Filed: May 4, 1998

Related U.S. Application Data

[60] Provisional application No. 60/046,263, May 12, 1997.

[51] Int. Cl.[7] .............................. B01D 59/44; H01J 49/00

[52] U.S. Cl. .............................................. 250/282; 250/292

[58] Field of Search ....................................... 250/282, 292

[56] References Cited

U.S. PATENT DOCUMENTS

| | | | |
|---|---|---|---|
| 3,147,445 | 9/1964 | Wuerker et al. | 250/292 |
| 4,090,075 | 5/1978 | Brinkmann | 250/292 |
| 4,481,415 | 11/1984 | Takeda et al. | 250/292 |
| 4,721,854 | 1/1988 | Dawson | 250/290 |
| 5,089,703 | 2/1992 | Schoen et al. | 250/292 |
| 5,187,365 | 2/1993 | Kelly | 250/292 |
| 5,204,530 | 4/1993 | Chastagner | 250/281 |
| 5,291,017 | 3/1994 | Wang et al. | 250/292 |
| 5,598,001 | 1/1997 | Flory et al. | 250/292 |
| 5,672,870 | 9/1997 | Flory et al. | 250/292 |
| 5,998,787 | 12/1999 | Hager | 250/282 |

FOREIGN PATENT DOCUMENTS

| | | | |
|---|---|---|---|
| 0 237 259 | 9/1987 | European Pat. Off. | H01J 49/42 |
| WO 97/47025 | 12/1997 | WIPO | H01J 49/42 |
| WO 98/22972 | 5/1998 | WIPO | H01J 49/42 |

OTHER PUBLICATIONS

A.N. Hayhurst, “The operation of a quadrupole mass filter with the d.c. voltage removed when sampling ions from a source at high pressure and temperature”, Aug. 15, 1995.

Raymond E. Kaiser, Jr., Extending the Mass Range of the Quadrupole Ion Trap Using Axial Modulation.

J. Throck Watson, “A technique for mass selective ion rejection in a quadrupole reaction chamber”, pp. 225–235.

*Primary Examiner*—Bruce C. Anderson
*Attorney, Agent, or Firm*—Bereskin & Parr

[57] ABSTRACT

An RF-only quadrupole mass spectrometer in which an auxiliary RF field (dipole or quadrupole) excites selected ions at low q (typically between 0.20 and 0.89). The excited ions experience radial excursions, but many do not experience excursions sufficient to strike the rods, and are therefore transmitted and acquire increased kinetic energy in the fringing fields at the exit ends of the rods. The excited ions may therefore be selected from the non-excited ions either by their increased axial kinetic energy, or by their radial dispersion, or both, and are detected for analysis, producing sharp peaks of high sensitivity at low q, while retaining the high acceptance and other advantages of RF-only mass spectrometers. Operated in converse fashion, a high quality notch filter can be achieved. In the notch filter, an auxiliary RF field again excites ions and notches some of them out by causing them to strike the rods. Ions which are not notched out but which are nevertheless excited by the auxiliary field are discriminated against, again either by reason of their higher axial kinetic energy or their spatial dispersion or both, so that only ions on axis are detected, producing a high resolution high sensitivity notch filter.

30 Claims, 22 Drawing Sheets

RF-ONLY MASS SPECTROMETER WITH AUXILIARY EXCITATION

This application claims benefit of Provisional application Ser. No. 60/046,263 filed May 12, 1997.

FIELD OF THE INVENTION

This invention relates to methods and apparatus for mass analysis in a multipole mass spectrometer, which will usually be a quadrupole mass spectrometer. More particularly, it relates to such methods and apparatus for use with a multipole mass spectrometer which employs RF-only, or substantially RF-only, as its drive.

BACKGROUND OF THE INVENTION

RF-only quadrupole mass spectrometers operating near q=0.908 are very well known, and have certain advantages over mass spectrometers which employ both RF and DC drive voltages. In particular, these RF-only quadrupole mass spectrometers are typically more sensitive than those which employ RF and DC, since in RF-only mass spectrometers, there is no need to be concerned about the effects of the DC on incoming ions, which effects can cause rejection of desired ions. In other words, the acceptance of an RF-only mass spectrometer is typically higher than for an RF/DC mass spectrometer. In addition, the high mass transmission of an RF-only mass spectrometer is typically higher than that of an RF/DC mass spectrometer. The operation of an RF-only mass spectrometer is also usually somewhat simpler, since there is no need to ramp DC with RF. However the peak shape and signal to background of an RF-only mass spectrometer can be more dependant on initial conditions, such as energy and velocity dispersion, and therefore have in the past been generally inferior to that of an RF/DC mass spectrometer.

Various efforts have been focussed on improving the performance of RF-only mass spectrometers, by improving their ability to detect energized ions (e.g. see Peter H. Dawson, U.S. Pat. No. 4,721,854). An alternative approach is discussed in U.S. Pat. No. 5,089,703 issued Feb. 18, 1992. This patent discloses the concept of applying an auxiliary dipole or quadrupole field which excites ions in near resonance with the excitation field by causing them to gain transverse kinetic energy and be rejected, thus producing a notch in the transmission band and allowing derivation of a mass spectrum having improved resolution. The auxiliary field was then modulated in such a way as to permit selective detection of only the modulated ions near q=0.908. However in both cases, this method has the requirement to operate at or just below q=0.908, thereby limiting the mass range of the device.

BRIEF SUMMARY OF THE INVENTION

Accordingly, it is an object of the present invention to provide an improved mass spectrometer (typically a continuous beam mass spectrometer), which is operated with RF-only or with a small amount of resolving DC, and which uses an auxiliary RF voltage (typically a dipole or quadrupole voltage) to allow production of a mass spectrum having potentially improved resolution and at a wide range of q which can be substantially less than the normal stability limit of 0.908. This has several advantages, including extension of the mass range, reduction of the amplitude of the RF drive voltage, enlargement of rod diameter, enlargement of the drive frequency, or all of the above.

An advantage in a preferred aspect of the invention is that the excitation source is separate from the drive frequency, permitting separate control of the wave forms, amplitudes, etc., which may aid in improved resolution and/or transmission.

In one aspect the invention provides a method of operating a multipole mass spectrometer having an entrance end and an exit end, and having a plurality of pairs of rod-like electrodes extending along an axis, comprising:

(a) supplying ions into the entrance end of the mass spectrometer (b) applying an RF drive voltage to said pairs of rods, while applying either no DC drive voltage or a very low DC drive voltage to said pairs of rods, to generate a substantially RF-only field in which a range of ion masses is stable and pass through said spectrometer while other ion masses are rejected, (c) applying an auxiliary RF voltage to said rods at a selected q to radially excite ions which are in resonance with said auxiliary RF field but at an amplitude low enough that a plurality of such excited ions do not strike said electrodes but instead are transmitted through said spectrometer, (d) at the exit end of the mass spectrometer, for ions that have been transmitted through the mass spectrometer, discriminating between said plurality of excited ions and other ions; and (e) and detecting and analyzing at least some of said plurality of excited ions.

In another aspect the invention provides a multipole mass spectrometer having a plurality of rod-like electrodes arranged in pairs in parallel about a longitudinal central axis to project between said rods in the axial direction a beam of ions to be analyzed, said spectrometer having an exit end, a detector adjacent said exit end to detect ions which are transmitted through said electrodes, said spectrometer comprising:

(a) an RF drive voltage source for applying an RF drive voltage between pairs of said electrodes to generate an RF field in which a selected range of ion masses are stable and pass through said rods and other ion masses are rejected by becoming unstable, (b) an auxiliary RF drive source for generating an auxiliary RF field having a selected q, for exciting selected ions which are in resonance with said auxiliary RF field to cause a plurality of said selected ions to experience radial excursions of amplitude insufficient to strike said rods, so that said plurality of excited ions are transmitted through said rods, (c) a discriminator for selecting excited ions at said exit end from other ions at said exit end, (d) and a detector for detecting such selected excited ions.

In yet another aspect the invention provides an improved method and apparatus for notch filtering. In one aspect the invention provides a method of operating a rod type multipole mass spectrometer having an entrance end and an exit end, and having (a) supplying ions into the entrance end of the mass spectrometer; a plurality of rod-like electrodes comprising:

(b) applying an RF drive voltage to said mass spectrometer to generate an RF field in which a range of ion masses are stable and pass through said spectrometer, (c) applying an auxiliary RF voltage to said electrodes to radially excite ions which are in resonance with said auxiliary RF voltage, causing some of said radially excited ions to strike said electrodes and causing a plurality of said radially excited ions to have radial excursions insufficient to strike said electrodes so that said plurality of excited ions are transmitted through said electrodes, (d) at the exit end of the mass spectrometer, for ions that have been transmitted through the mass spectrometer, discriminating between said plurality of excited ions and other ions; and (e) and detecting for analysis substantially only ions which neither strike said electrodes nor were energized by said auxiliary RF voltage.

Further objects and advantages of the invention will appear from the following description, taken together with the accompanying drawings.

DETAILED DESCRIPTION OF PREFERRED EMBODIMENTS

Figure 1:
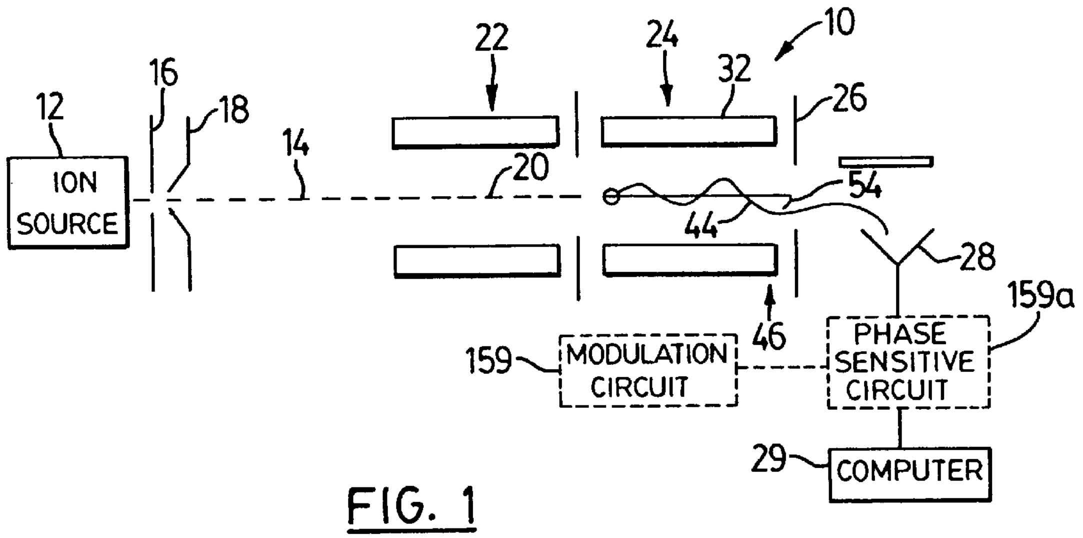
FIG. 1 is a diagrammatic view of a mass spectrometer according to the invention.
Figure 2A:
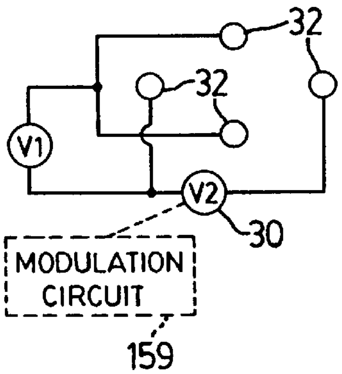
FIG. 2A is an end view of the rods of the mass spectrometer of FIG. 1, showing a main RF drive voltage and an auxiliary dipole excitation voltage applied thereto.
Figure 2B:
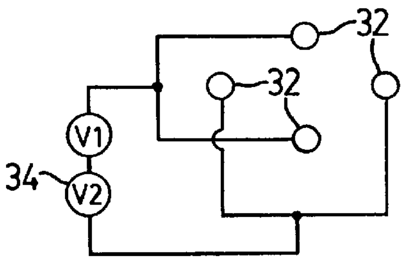
FIG. 2B is a view similar to FIG. 2A but showing use of a quadrupolar excitation voltage.

Reference is first made to FIGS. 1 and 2, which illustrate diagrammatically a mass spectrometer 10 according to the invention. The mass spectrometer 10 includes an ion source 12 which projects ions along an axis 14 through an aperture plate 16, a skimmer 18, and along a vacuum chamber ion path 20 which may include any desired means (e.g. one or more resolving spectrometers and/or collision cells) for processing of the ions. The ions then enter an RF-only quadrupole 22 at a pressure of (e.g.) $2\times10^{-3}$ torr, which pressure is high enough to produce (by collisional cooling) a well collimated ion beam centered on the axis 14 and with low energy dispersion and low axial kinetic energy (as will be discussed). The ions then enter RF-only quadrupole 24 which is evacuated (by pumps, not shown) to a relatively low pressure, e.g. $2\times10^{-5}$ torr and is driven by RF voltage V1 (FIGS. 2A, 2B) of frequency Ω. Ions emerging from quadrupole 24 pass through lens 26 and are detected by detector 28. The detected signal is processed by a computer 29.

As shown in FIGS. 2A, 2B, an auxiliary or supplemental voltage V2 of frequency ω is also provided. Auxiliary voltage V2 can be a dipole voltage, applied by dipole source 30 across a pair of rods 32, or can be quadrupole excitation, applied by quadrupole source 34 across respective pairs of the rods 32. V2 will be referred to as an auxiliary excitation voltage, or excitation voltage. Other excitation sources, such as dual dipole excitation, phase shifted quadrupolar excitation, or other forms of excitation such as octopolar excitation (under appropriate circumstances) can also be used. (Auxiliary excitation for mass range extension is applied in the separate field of gaseous ion traps; see R. E. Kaiser, J. N. Louris, J. W. Any, and R. G. Cooks, Rapid Commun. Mass. Spec. 3 (1989) 225).

In the examples described, the rods 32 were 20 cm long, except where indicated, but other lengths may be used, as will be described.

In normal use of the mass spectrometer 10 shown in FIG. 1, ions within the acceptance range of quadrupole 24, as determined by the frequency of the RF drive voltage V1, are transmitted along the axis 14 and are detected by detector 28. When the excitation frequency ω is near resonance with the secular frequency $\omega_0$ of the ion (e.g. for dipolar excitation, this occurs at $\omega=\omega_0$; for quadrupolar excitation, $\omega=\Omega\pm2\ \omega_0$), the ion absorbs energy from the excitation source. The excitation voltage V2 is usually of sufficient amplitude to cause radial excursions of those ions whose secular frequencies are in resonance, ejecting those ions and thereby causing a notch in the transmitted ion spectrum. A small such notch is shown at 40 in FIG. 3, which depicts a mass spectrum 42. As usual, m/z (mass to charge ratio) is plotted on the horizontal axis, and ion intensity (counts per second) on the vertical axis.

Figure 7:
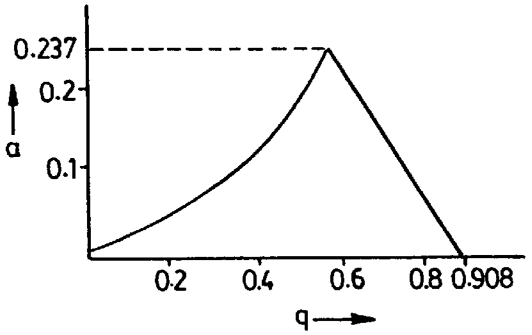
FIG. 7 shows a conventional a/q operating diagram for an RF-only mass spectrometer.

The ion's secular frequency is proportional to q in a complicated nonlinear fashion. However at q<0.4, the approximation can be made:

$$\omega \approx \frac{\Omega}{2}\left(a + \frac{q^2}{2}\right)^{\frac{1}{2}},$$

or for a=0 (which is the case for an RF-only mass spectrometer), $$\omega \approx \frac{q\Omega}{2\sqrt{2}}$$

where a and q are obtained from the well-known equations $$q = \frac{4eV}{r_0^2\Omega^2 m}$$

$$a = \frac{8eU}{r_0^2\Omega^2 m}$$

where U is the DC voltage, V is the RF voltage (V1), $r_0$ is the radius of the inscribed circle between the rods 32, Ω is the angular frequency (radians/second) of the drive voltage as mentioned, and m is the mass of the ion. The operation of a quadrupole is commonly represented by an a/q diagram, such as shown in FIG. 7. Ions which have a and q values outside the limits of stability as shown in the a/q diagram increase their amplitude of oscillation and are lost to the rods.

Therefore, scanning the excitation frequency, or scanning q, will result in a notch spectrum that varies with mass in a predictable way.

Figure 4:
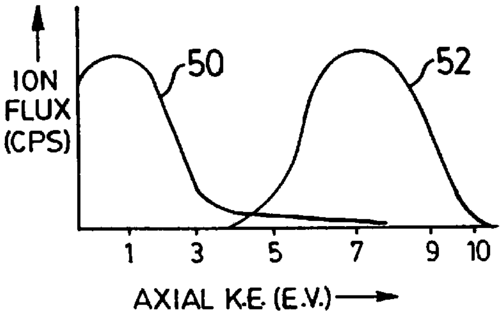
FIG. 4 is a graph which plots ion flux against ion energy.

While some of the ions have been excited sufficiently by the excitation voltage V2 to strike the rods 32, the inventor has appreciated that other ions of the same mass have also been excited to some extent, i.e. they have acquired radial excursions, but not sufficiently to strike the rods 32. The trajectory of one of these ions is indicated at 44 in FIG. 1. It will be seen that the trajectory 44 is typically off the axis 14 at the exit end 46 of the rods 32. Ions which are off axis at the exit end of rods 32 will pick up axial kinetic energy in the fringing fields at this location and will have substantially more axial kinetic energy than ions which are on the axis 14. This is shown in FIG. 4, which plots axial kinetic energy in electron volts on the horizontal axis and ion flux (in counts per second) on the vertical axis. Curve 50 shows the energy distribution at the exit end 46 of the rods 32 for ions which have not been radially excited by the excitation voltage V2. Curve 52 shows the corresponding energy distribution for ions which have been excited by the excitation voltage V2. It will be seen that the ions which have been excited have a much higher kinetic energy range, and can therefore be separated from the unexcited ions, e.g. by placing a repulsive voltage on exit lens 26 (FIG. 1), between the exit end 46 of the rods and detector 28. Using the energy distributions in FIG. 4 as an example, if the repulsive voltage on lens 26 is set e.g. at 4 volts, this will repel most of the unexcited ions but will allow most of the ions which have been excited by the excitation voltage V2 to pass by the energy barrier constituted by lens 26 and be detected by detector 28. The trajectory of an ion which has been repelled is indicated diagrammatically at 54 in FIG. 1. Such ions will typically strike the rods 32 and will exit the process.

Figure 3:
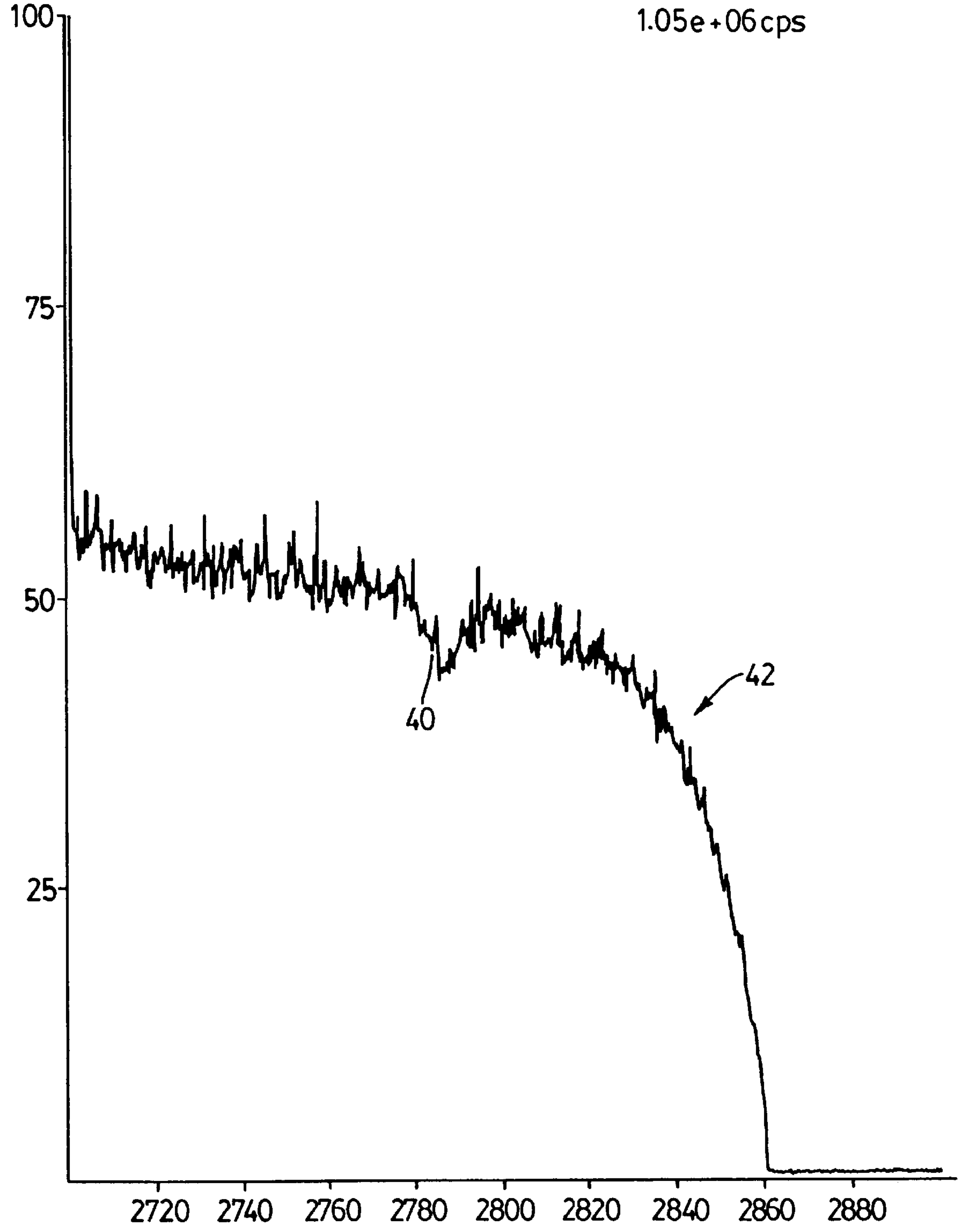
FIG. 3 shows a mass spectrum having a notch therein.
Figure 5:
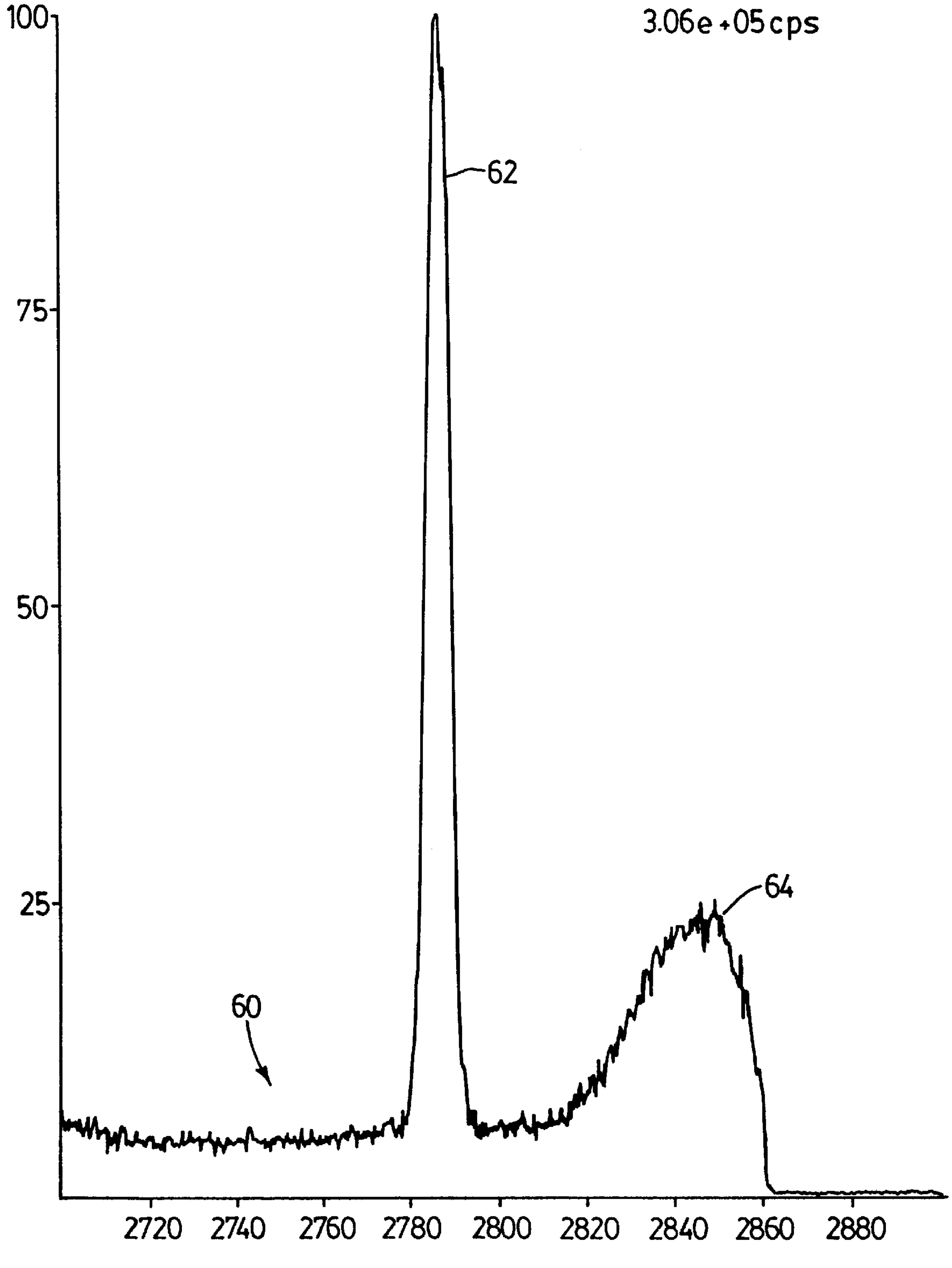
FIG. 5 is a plot showing a mass spectrum achieved according to the invention.

When a repulsive energy barrier 26 is used as shown in FIG. 1, the spectrum 42 in FIG. 3 changes to that shown at 60 in FIG. 5. Both drawings show the spectrum for reserpine, and it will be seen that in place of the small notch 40 at mass 609 in FIG. 3, there is a large peak 62 at mass 609. In both cases, the amplitude of the excitation voltage V2 was very low (about 100 millivolts), producing a very low efficiency notch 40. As mentioned, the notch 40 in FIG. 3 represents ions which have been ejected and thus removed from the transmission, while the peak 62 in FIG. 5 represents the remaining excited ions which have been transmitted. In FIG. 5, the peak 62 occurred at a q of 0.88.

It will be seen that FIG. 5 also shows the conventional RF-only peak 64 at q=0.908. Typical of this system, possibly due to stricter entrance requirements, peak 64 is poorly resolved, as will be apparent from the drawing.

Figure 6:
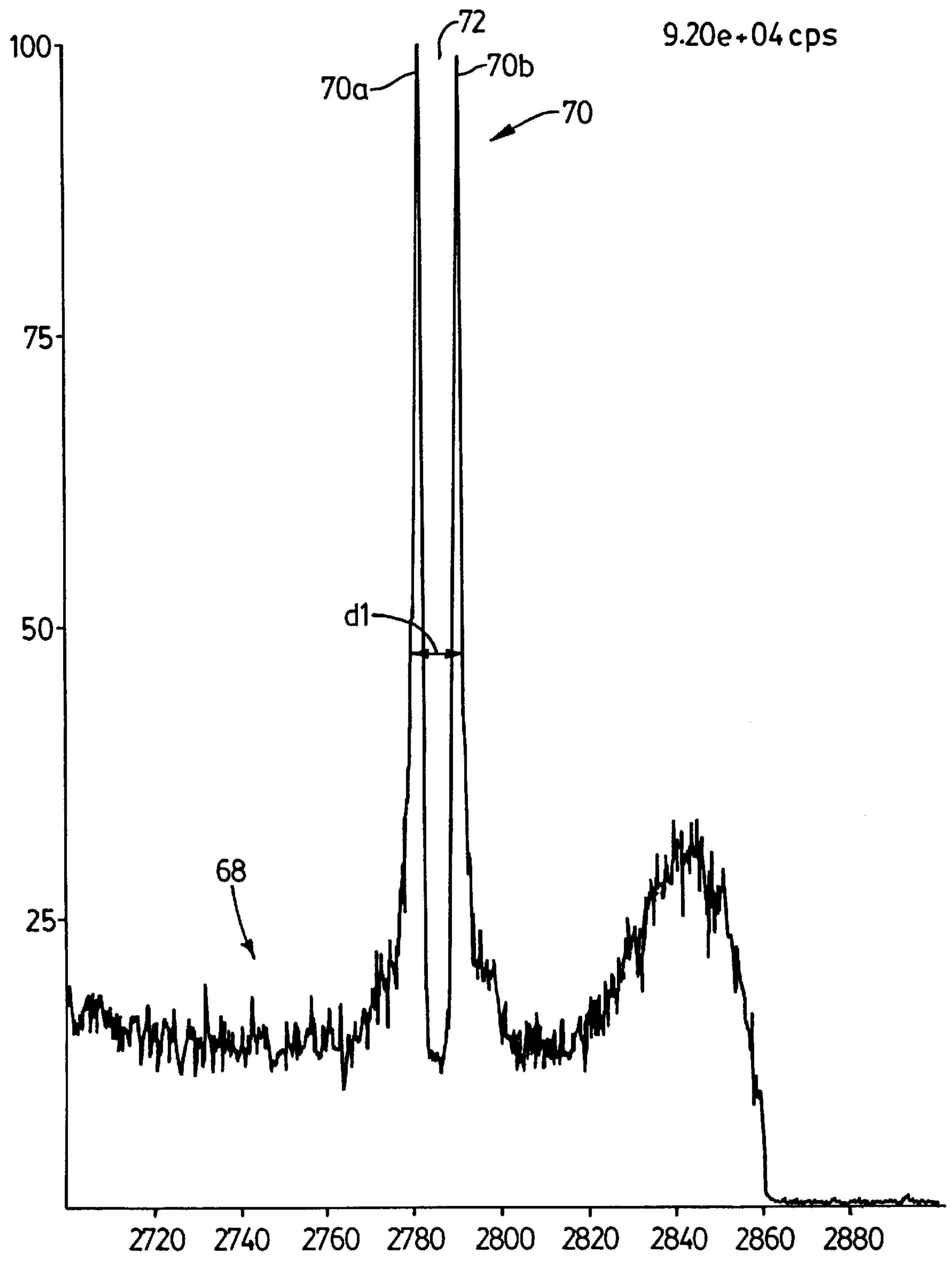
FIG. 6 is a plot showing another mass spectrum achieved according to the invention, with a split peak.

If the auxiliary voltage V1 is increased e.g. to 500 millivolts, the mass spectrum 68 of FIG. 6 results, having a "peak" 70 at mass 609. It will be seen that in FIG. 6, the center of the peak 70 has been "notched out", leaving side peaks 70*a*, 70*b* on each side of what was formerly the main peak 62. This indicates that the ions which had formerly been excited by excitation voltage V2, but which had not been so excited as to be ejected, have now been sufficiently excited to strike the rods 32 and were therefore rejected, rather than being transmitted. The space 72 between side peaks 70*a*, 70*b* represents ions which were rejected, while the dimension d1 indicates the true bandwidth of the ions which were excited by the excitation voltage V2. The notched spectrum shown in FIG. 6 may be useful in some types of analyses.

The possibility of using the continuous beam quadrupole as a mass filter was first suggested by Paul et al., U.S. Pat. No. 2,939,952 dated June, 1960 and for typical ion sources was shown by several workers to yield poorly resolved peaks (see e.g. J. T. Watson, D. Jaouen, H. Mestdajh and C. Rolando (1989) Int. J. Mass Spectrom. Ion Processes 93, 225).)

Operation of an RF-only quadrupole, such as quadrupole 24, in the manner described has substantial advantages. In an RF/DC quadrupole, a mass spectrum is conventionally obtained by sweeping the RF and DC voltages through a range of values so that ions of increasing mass pass through the tip 76 of the stability diagram and are transmitted. However an RF-only quadrupole is essentially a transmissive device; it is operated on the q axis (a=0), and ions become unstable at q=0.908, and acquire transverse kinetic energy. RF-only quadrupoles have been used to produce mass spectra by scanning the amplitude of the RF voltage, thus transmitting ions only above a certain mass, producing a staircase-like curve which is differentiated to produce a mass spectrum (as shown in FIG. 2 of U.S. Pat. No. 5,089,703). With this approach, the resolution can be poor, and q is high. A high q limits the mass range or else requires a relatively high RF voltage, which is costly to supply. Additionally, the high q is provided by the drive frequency itself, thereby providing no separate control of the amplitude or periodicity of the exciting frequency.

Figure 8:
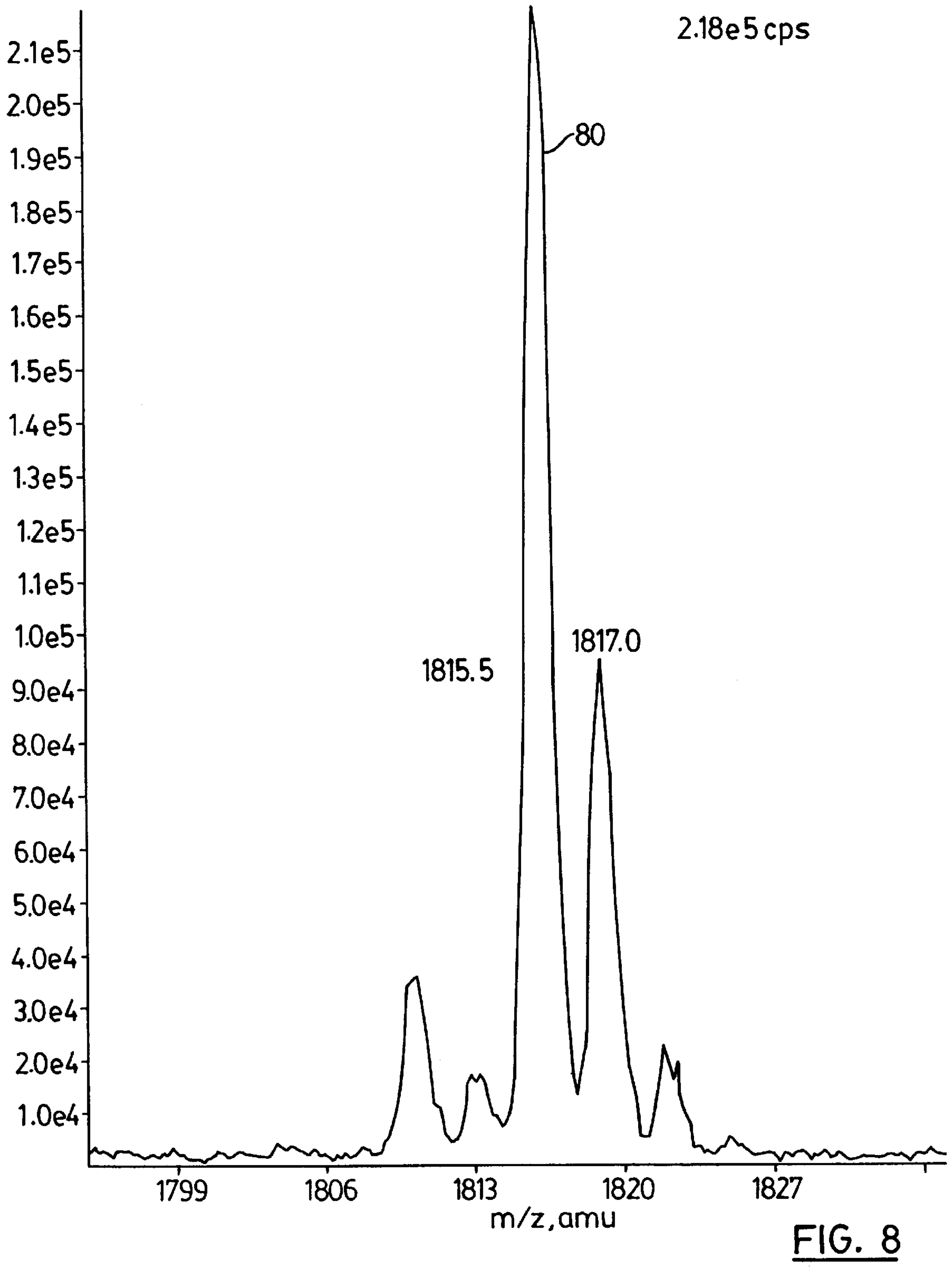
FIG. 8 shows another mass spectrum according to the invention.

With the methods described, using a separate excitation voltage V2, voltage V2 can be used to excite ions at a range of q's along the q axis, allowing for example either mass range extension, or a lower RF drive voltage, as mentioned. For example, FIG. 8 shows peak 80 for reserpine using a quadrupolar (rather than dipolar) excitation voltage V2, operated at q=0.55. Peak 80 at m/z 609 was well resolved and was approximately 0.6 amu wide at half height, at an intensity of 2.18 e5 ($2.18\times10^5$) counts per second. The full width at half height of the peak can be made as low as 0.3 amu with appropriate optimization, as shown in FIG. 9 where again a quadrupolar excitation voltage V2 was used at q=0.55, with reserpine. The 0.3 amu width of peak 82 at m/z 609 was as good as or better than most resolving quadrupoles which use both RF and DC, and the sensitivity (at 2.78 e4 counts per second) was also considered to be good.

It will be realized that entrance conditions into the quadrupole 24 are important for practice of the invention. In particular, the kinetic energy distribution of ions entering quadrupole 24 should be narrow, and preferably the absolute values of those energies should be low. Radial dispersion is then imposed by the auxiliary dipole or quadrupole field. In practice a collimated beam of ions having low energy dispersion can be achieved, as is well known, by first passing the ions through an RF-only quadrupole or the like having gas therein, e.g. by using a conventional collision cell such as quadrupole 22, preceding quadrupole 24, and operated to provide collisional cooling. A typical gas pressure in quadrupole 22 is $2\times10^{-3}$ torr. Preferably the energy dispersion is less than 3 eV and the absolute axial kinetic energy of the ion beam entering quadrupole 24 is less than 5 eV.

Figure 10:
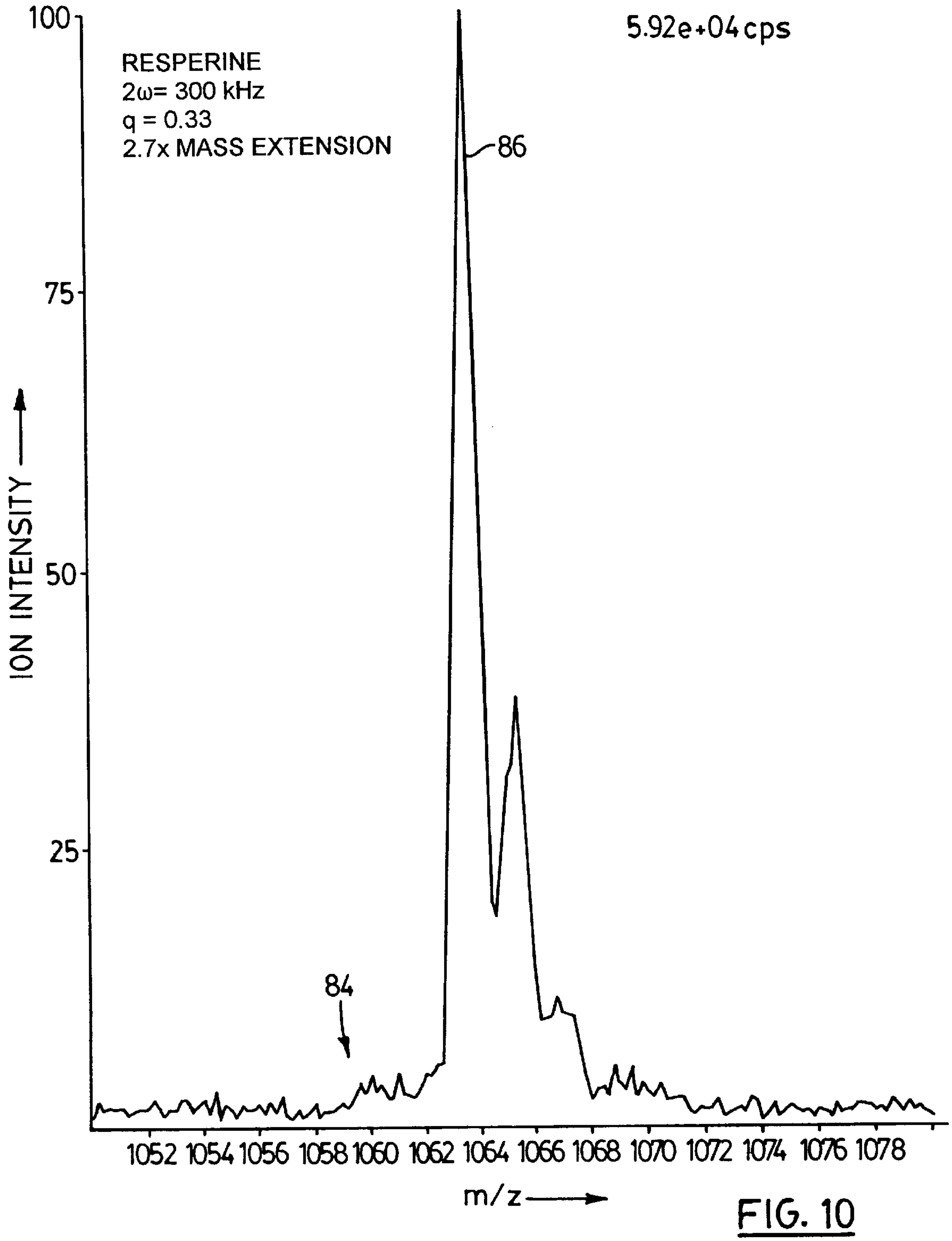
FIG. 10 shows a further mass spectrum according to the invention.

Reference is next made to FIG. 10, which shows another mass spectrum 84 for reserpine, made with quadrupolar excitation at q=0.33 (which is very low, since an RF-only quadrupole as mentioned normally operates at q≅0.908 and an RF/DC quadrupole operates at q≅0.71), with $2\omega_0$=300 KHz. It will be seen that peak 86 at m/z 609 was approximately 1 amu wide at half height, and the intensity was 5.92 e4 or $5.92\times10^4$ counts per second.

Figure 11:
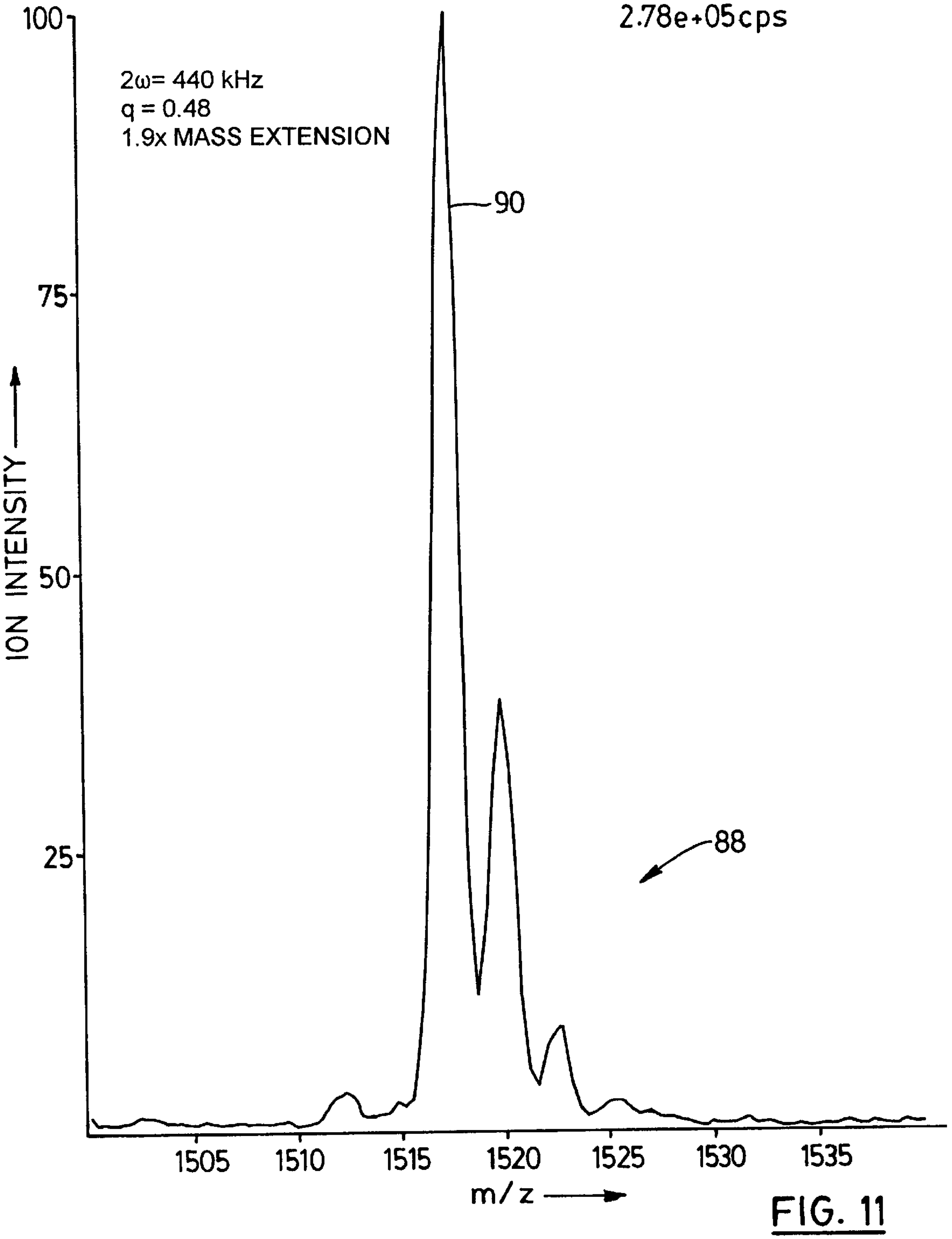
FIG. 11 shows another mass spectrum according to the invention.

FIG. 11 shows a mass spectrum 88 for reserpine similar to that of FIG. 10, with a peak 90 at m/z 609. Here, q was 0.408 and quadrupolar excitation was used ($2\omega_0$=440 KHz). The ion intensity was higher than in FIG. 10 (it was $2.78\times10^5$ counts per second).

Figure 12:
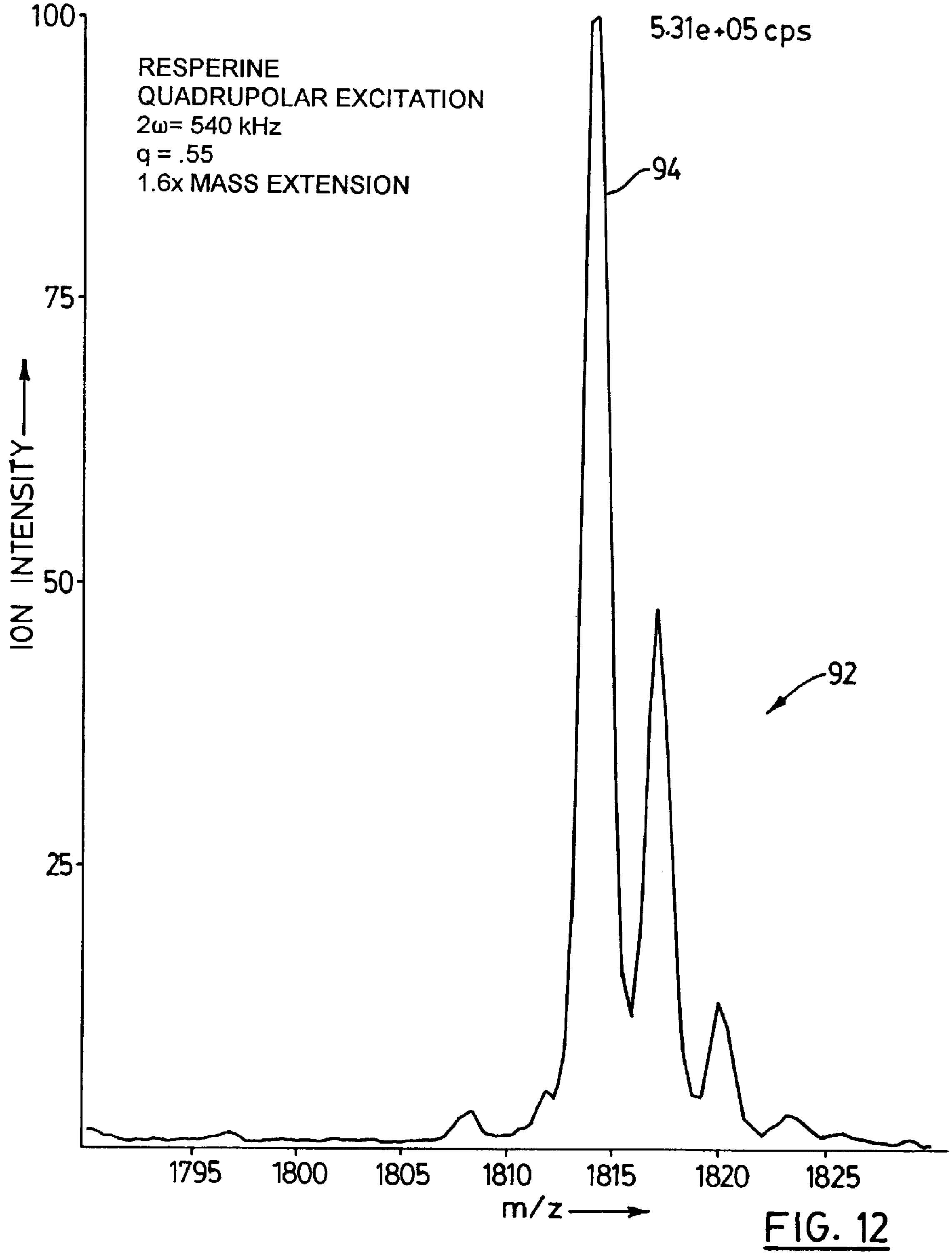
FIG. 12 shows another mass spectrum according to the invention.

FIG. 12 shows a spectrum 92 for reserpine, and peak 94 at m/z 609, similar to those of FIG. 11 but made at q=0.55 (again using quadrupolar excitation, $2\omega_0$=540 KHz). The ion intensity was $5.31\times10^5$ counts per second.

Figure 13:
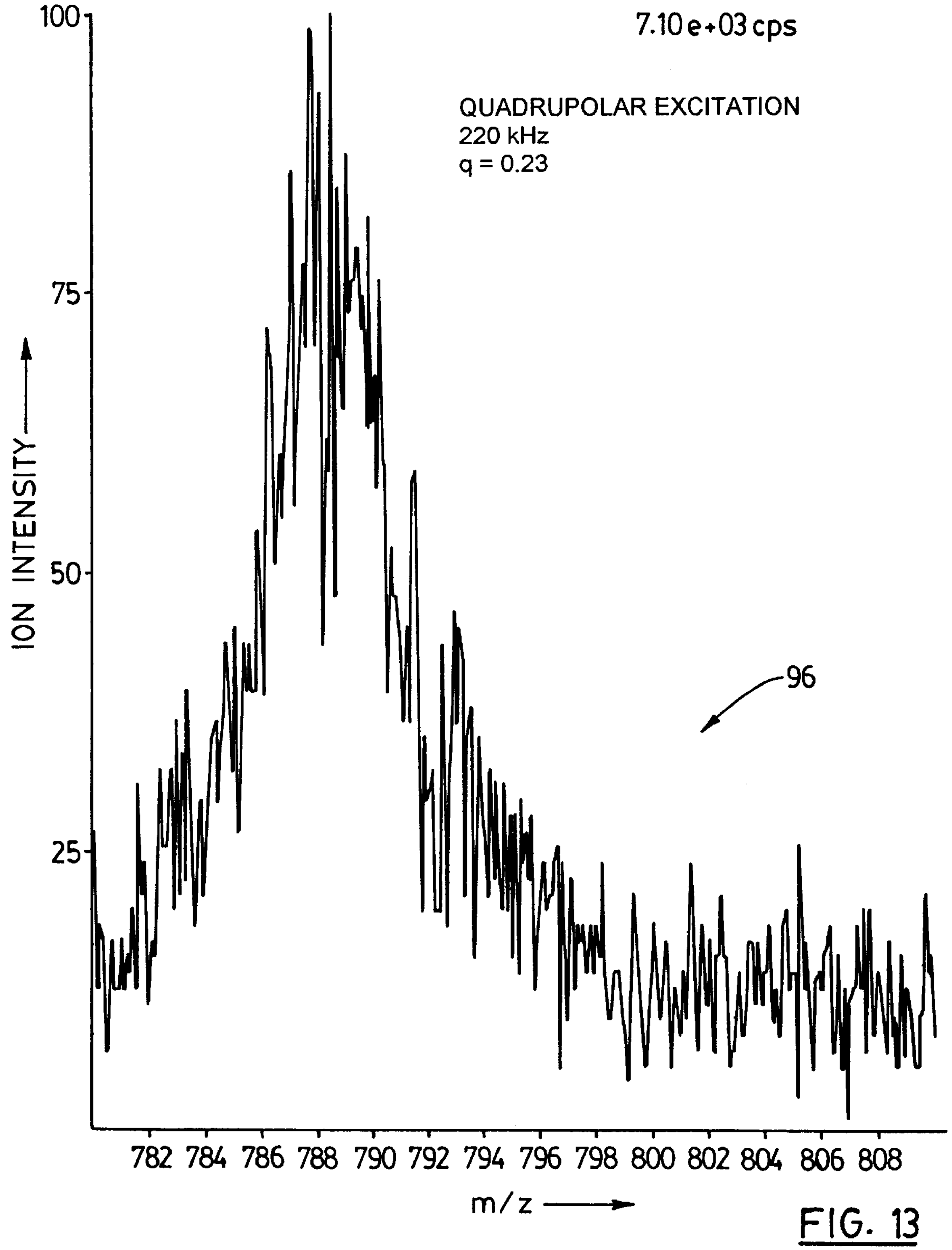
FIG. 13 shows a mass spectrum according to the invention but at very low q.

FIG. 13 shows a mass spectrum 96 for reserpine similar to that of FIG. 12 but with q=0.23, using quadrupolar excitation ($2\omega_0$=220 KHz). Here, the intensity was very low ($7.1\times10^3$ cps), and the peaks were not well resolved. However the spectrum 96 is usable for some purposes.

Figure 14:
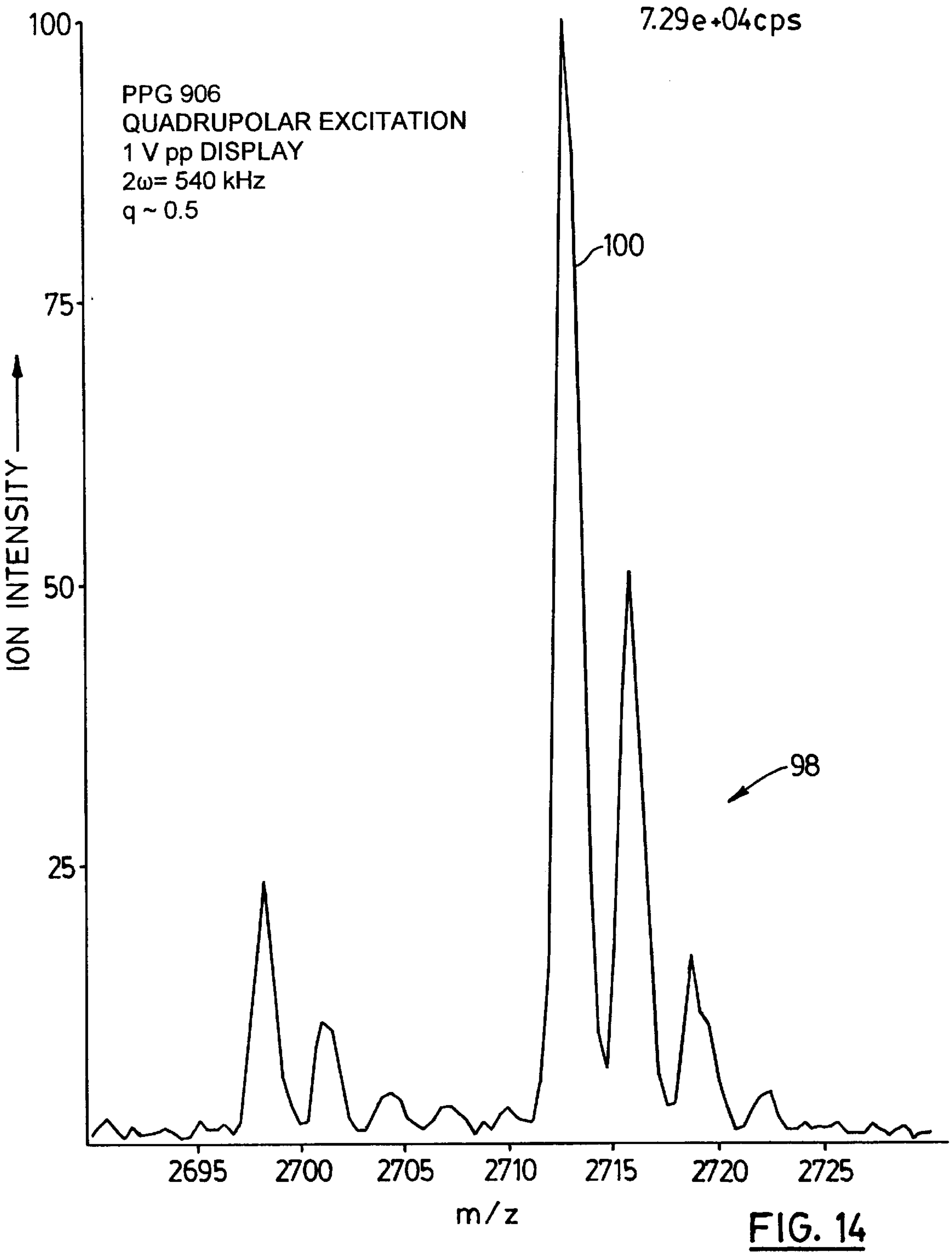
FIG. 14 shows a further mass spectrum according to the invention.

FIG. 14 shows a mass spectrum 98 for PPG at m/z 906, using q=0.5, quadrupolar excitation and $2\omega_0$=540 KHz. The peak 100 was well resolved and the intensity was $7.29\times10^4$ counts per second.

Figure 15:
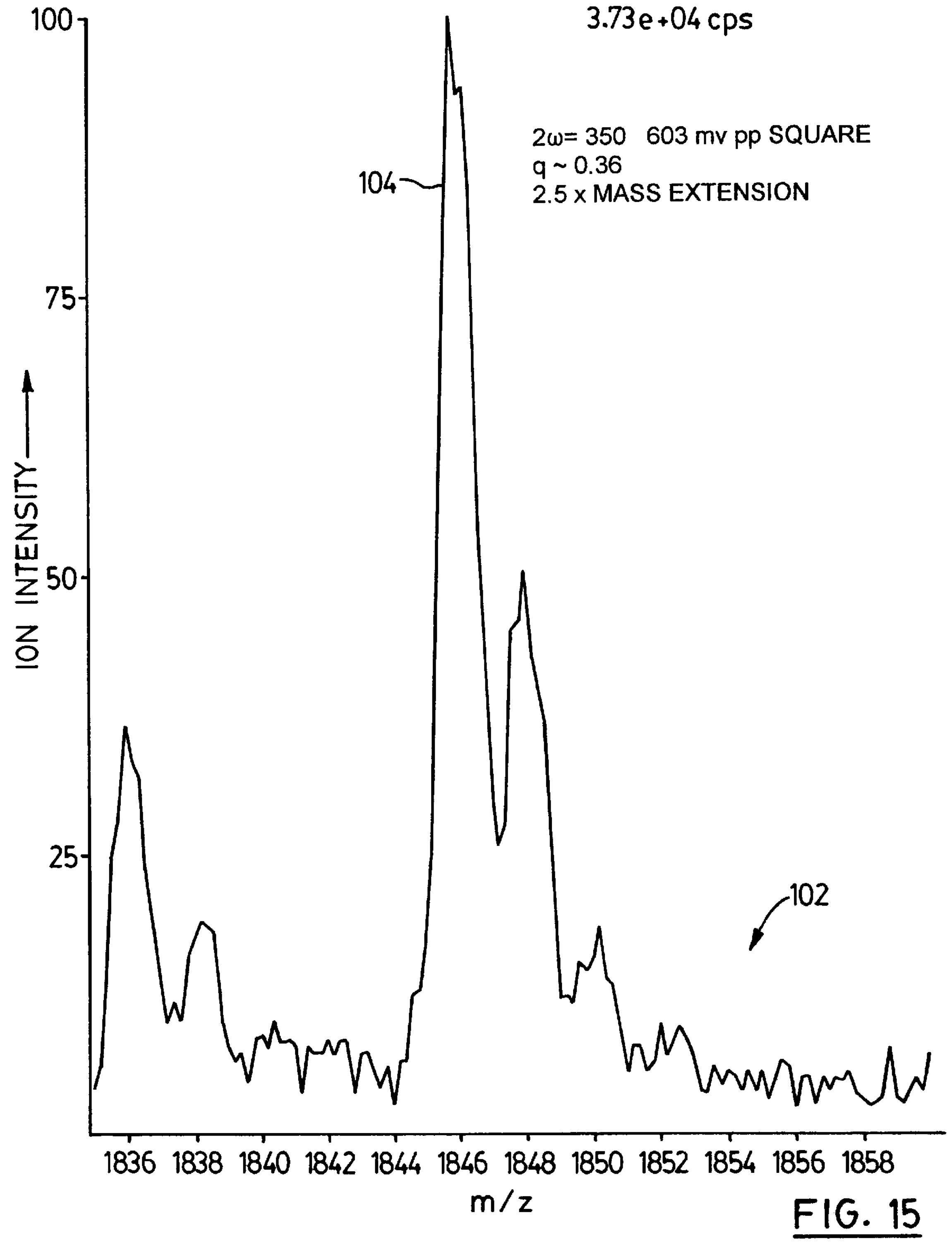
FIG. 15 shows another mass spectrum according to the invention.

FIG. 15 shows a spectrum 102 for PPG similar to that of FIG. 14, again using quadrupolar excitation ($2\omega_0$=350 KHz), and q=0.36. The peak 104 at m/z 906 was well resolved, although not as well as in FIG. 14, and the intensity was $3.73\times10^4$ counts per second, which was still very acceptable.

Figure 16:
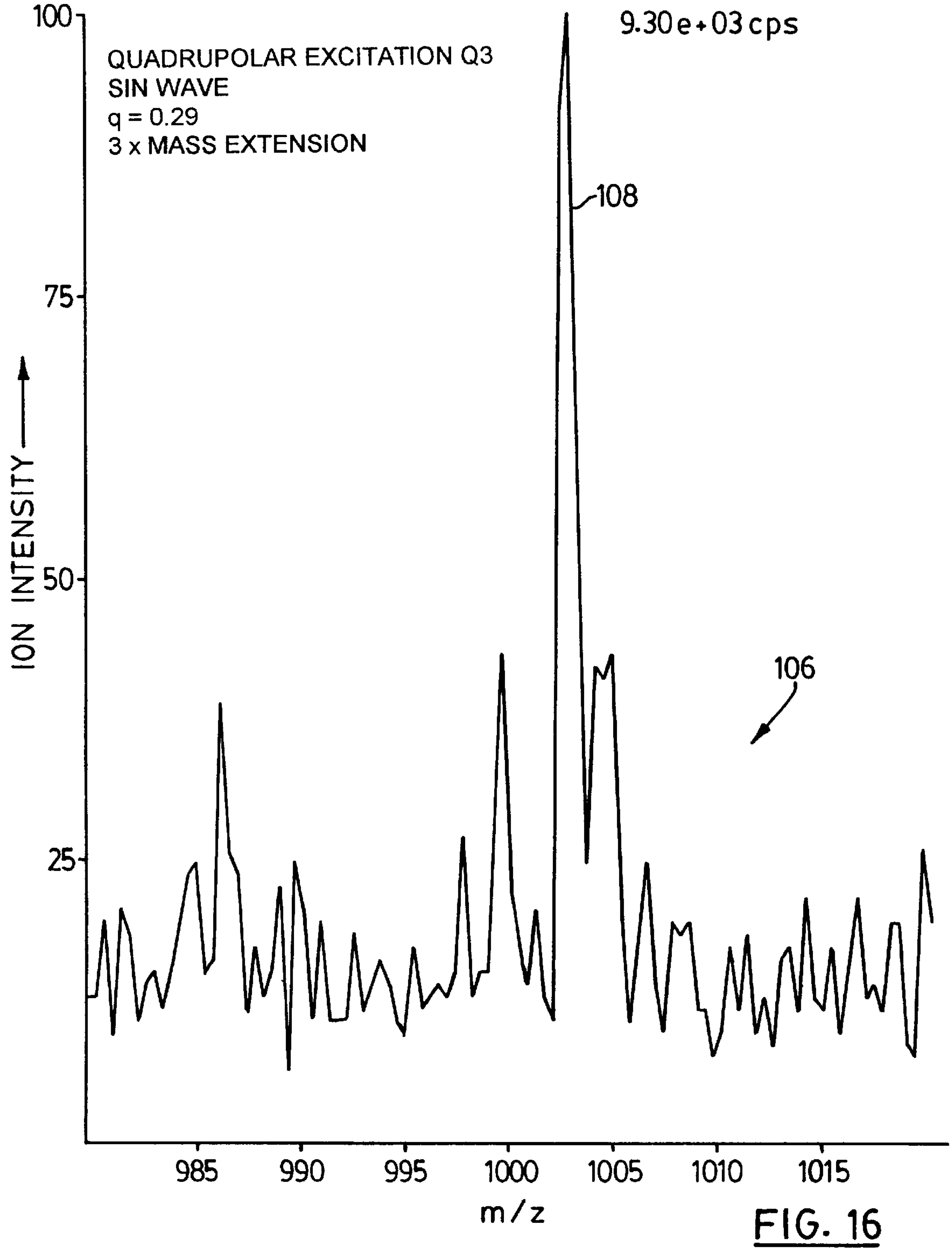
FIG. 16 shows another mass spectrum according to the invention but at low q.

FIG. 16 shows a mass spectrum 106 for PPG similar to that of FIG. 15, with quadrupolar excitation and q=0.29. The peak 108 at m/z 906 was still well resolved, but the signal intensity was reduced at $9.3\times10^3$ counts per second, i.e. the intensity scale was somewhat compressed. However the results were still clear enough for ready analysis.

Figure 17:
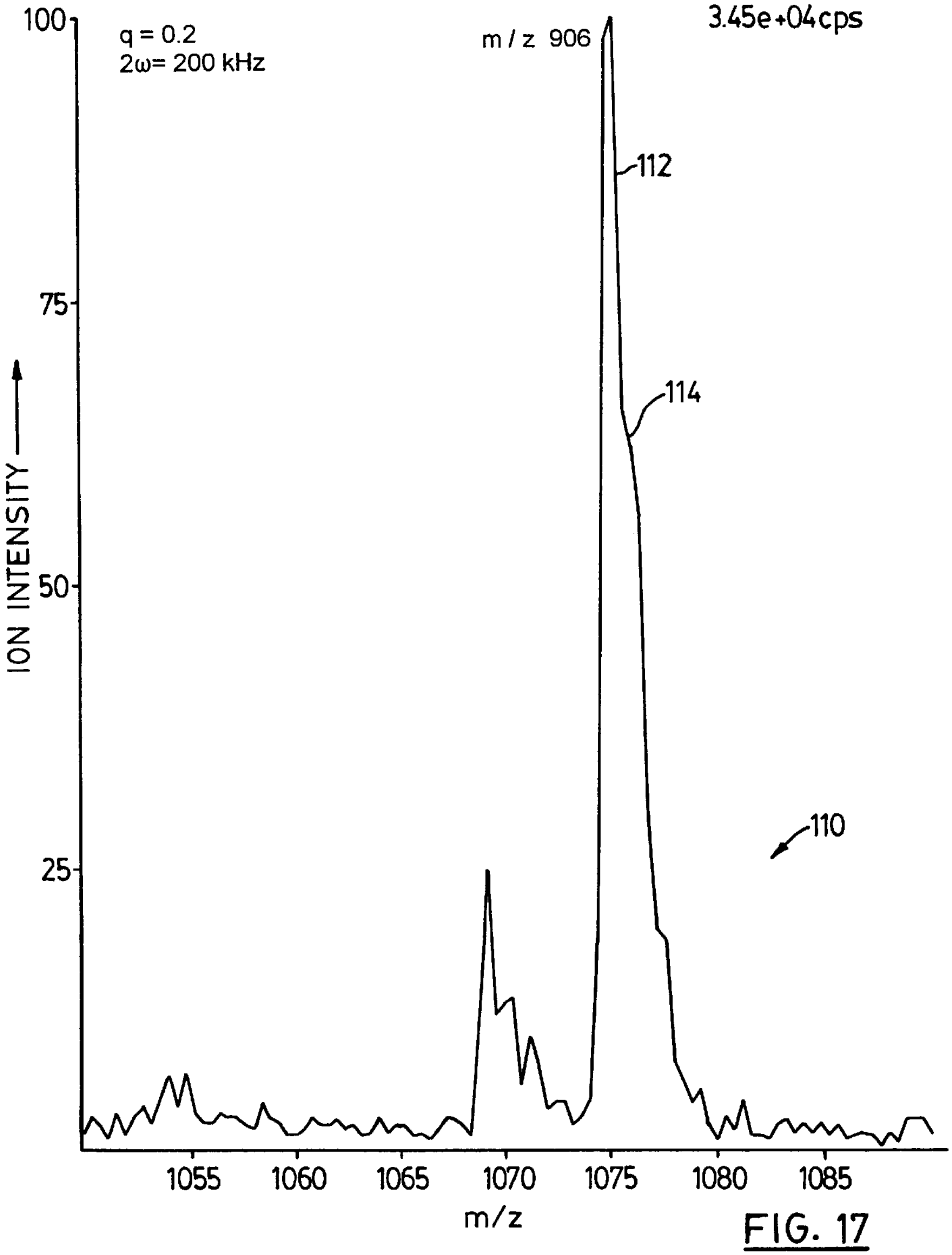
FIG. 17 shows a further mass spectrum according to the invention, also at low q.

FIG. 17 shows a mass spectrum 110 for PPG similar to that of FIG. 16 (using quadrupolar excitation, $2\omega_0$=200 KHz), with q=0.2. Here the peak 112 at m/z 906 was well resolved, but the adjacent peak indicated at 114, higher in the spectrum, was poorly resolved, largely because of the low q used.

Figure 9:
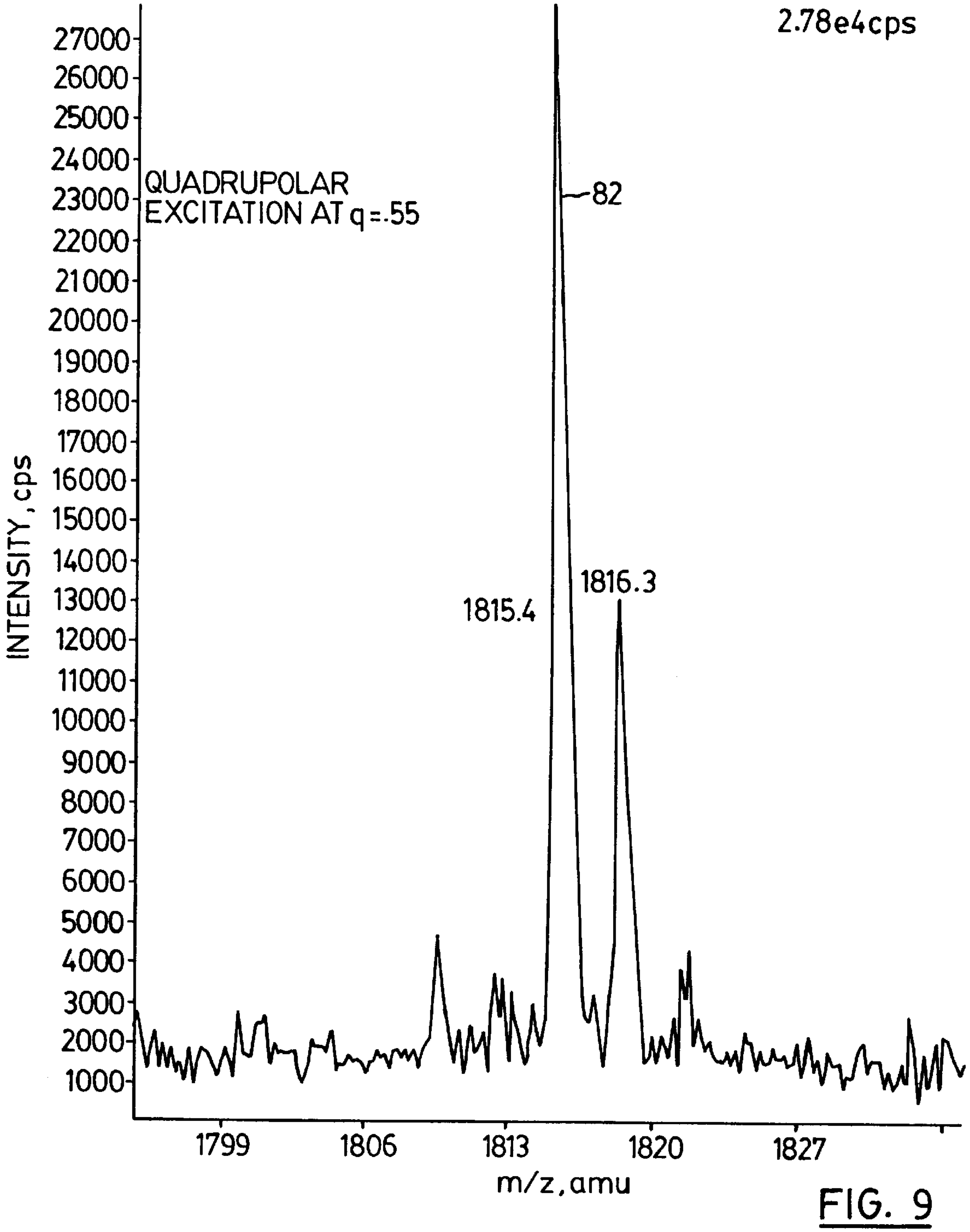
FIG. 9 shows another mass spectrum according to the invention.
Figure 18:
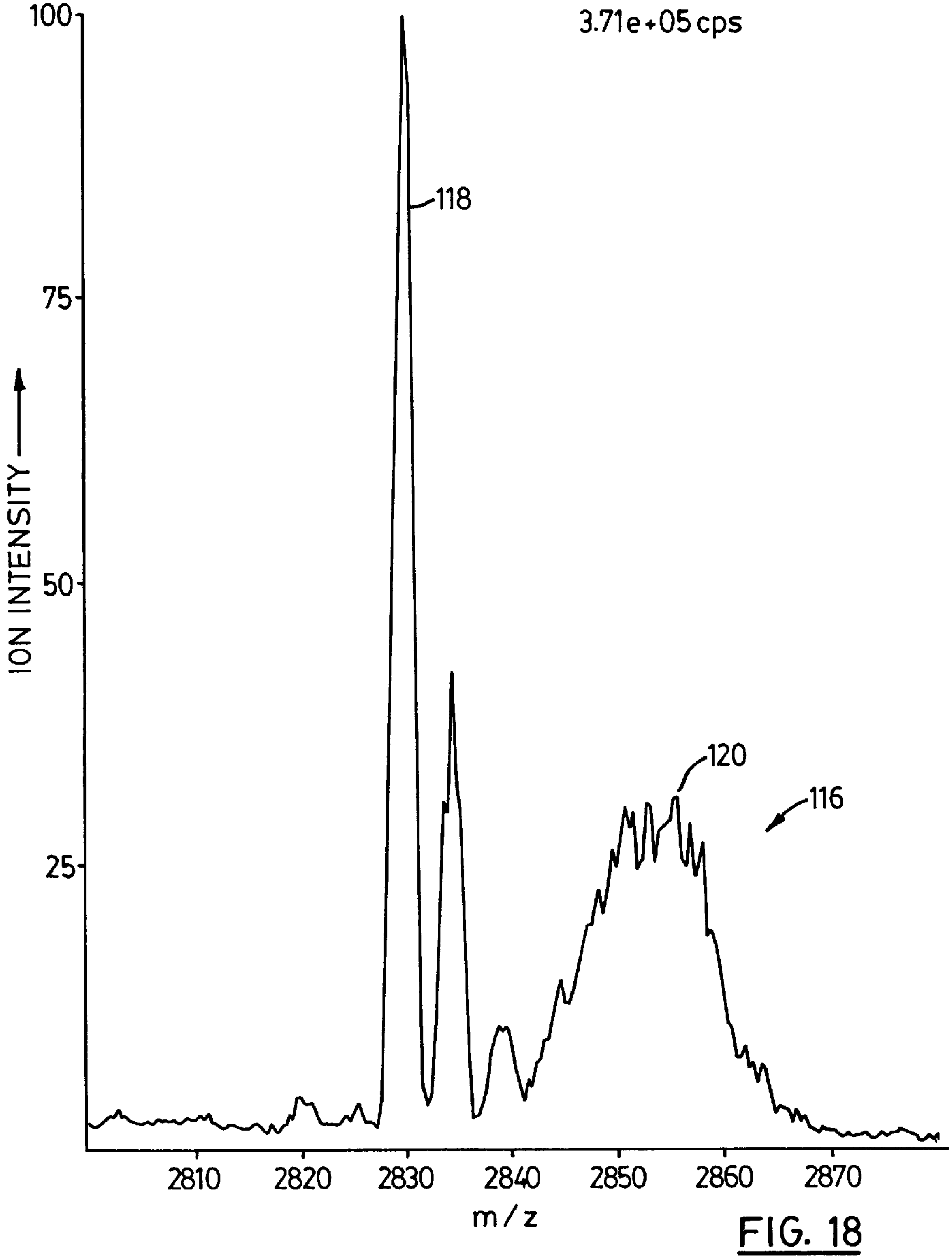
FIG. 18 shows another mass spectrum according to the invention.

FIG. 18 shows a mass spectrum 116 for reserpine similar to that of FIG. 9, using dipolar excitation at q=0.89, and with somewhat increased amplitude of dipolar excitation voltage V2 (here 1 volt peak to peak). The peak at m/z 609 and q=0.89 is shown at 118, while the RF-only peak at q=0.908 is shown at 120.

Figure 19:
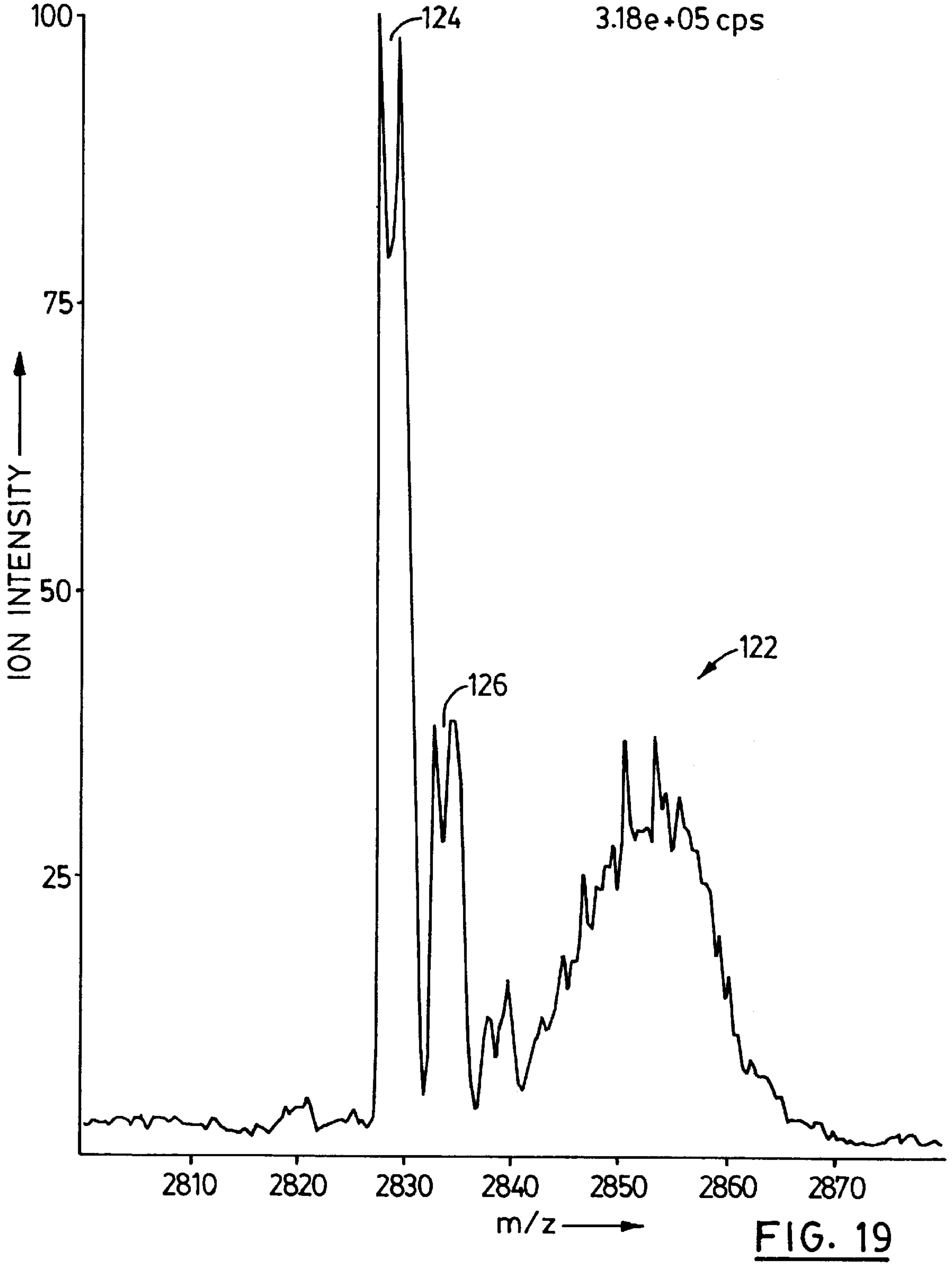
FIG. 19 shows a mass spectrum similar to that of FIG. 18 but with split peaks.

FIG. 19 shows a mass spectrum 122 for reserpine similar to that of FIG. 18 but with the dipole excitation voltage V2 increased to 1.5 volts peak to peak, resulting in notches 124, 126 in the peaks for masses 609 and 610 respectively.

Figure 20:
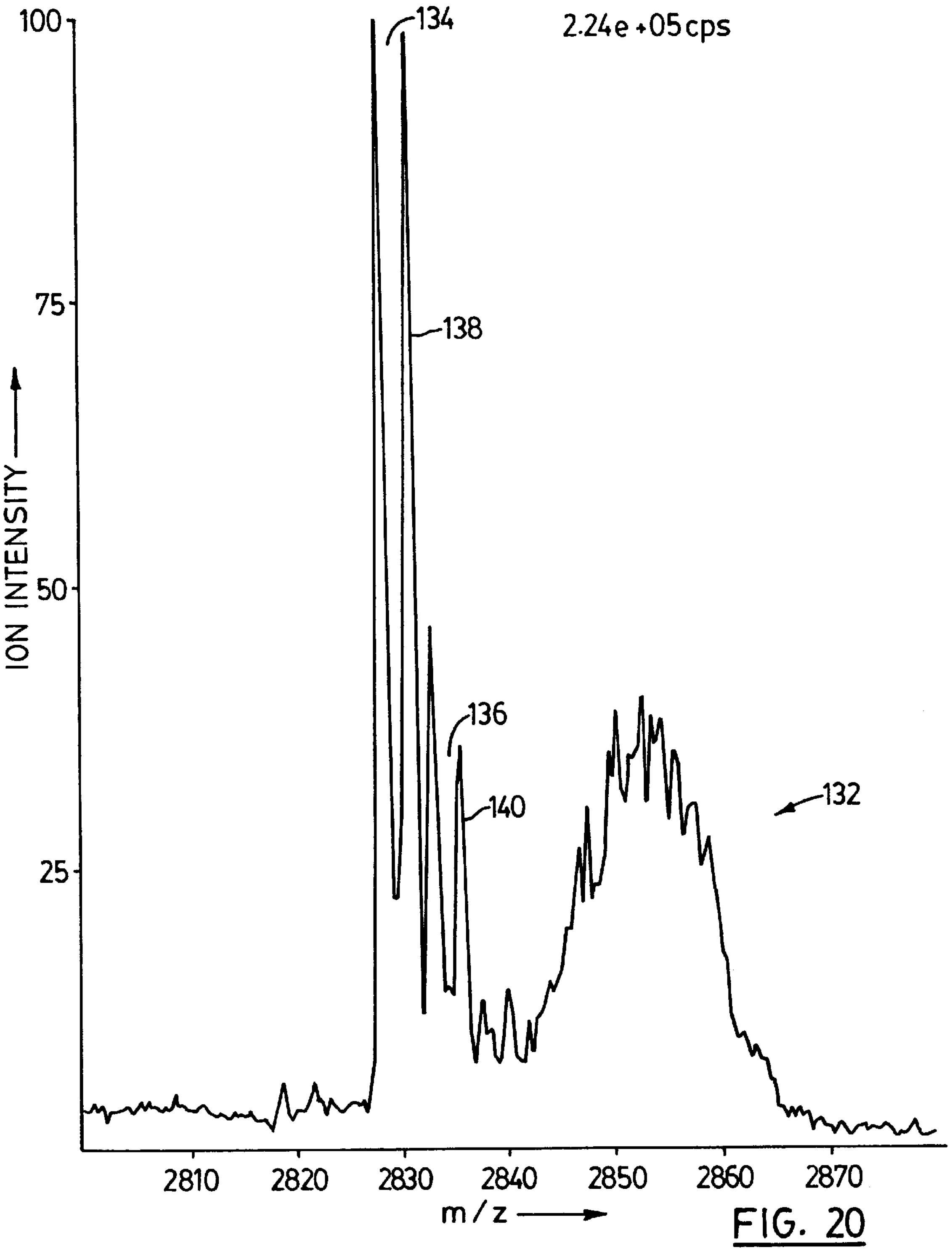
FIG. 20 shows another mass spectrum similar to that of FIG. 19 but with split peaks having deeper notches therein.

FIG. 20 shows a mass spectrum 132 similar to that of FIG. 19 but showing the effect of increasing the dipole excitation voltage to 2 volts peak to peak, resulting in increased amplitude notches 134, 136 in peaks 138, 140.

Figure 21:
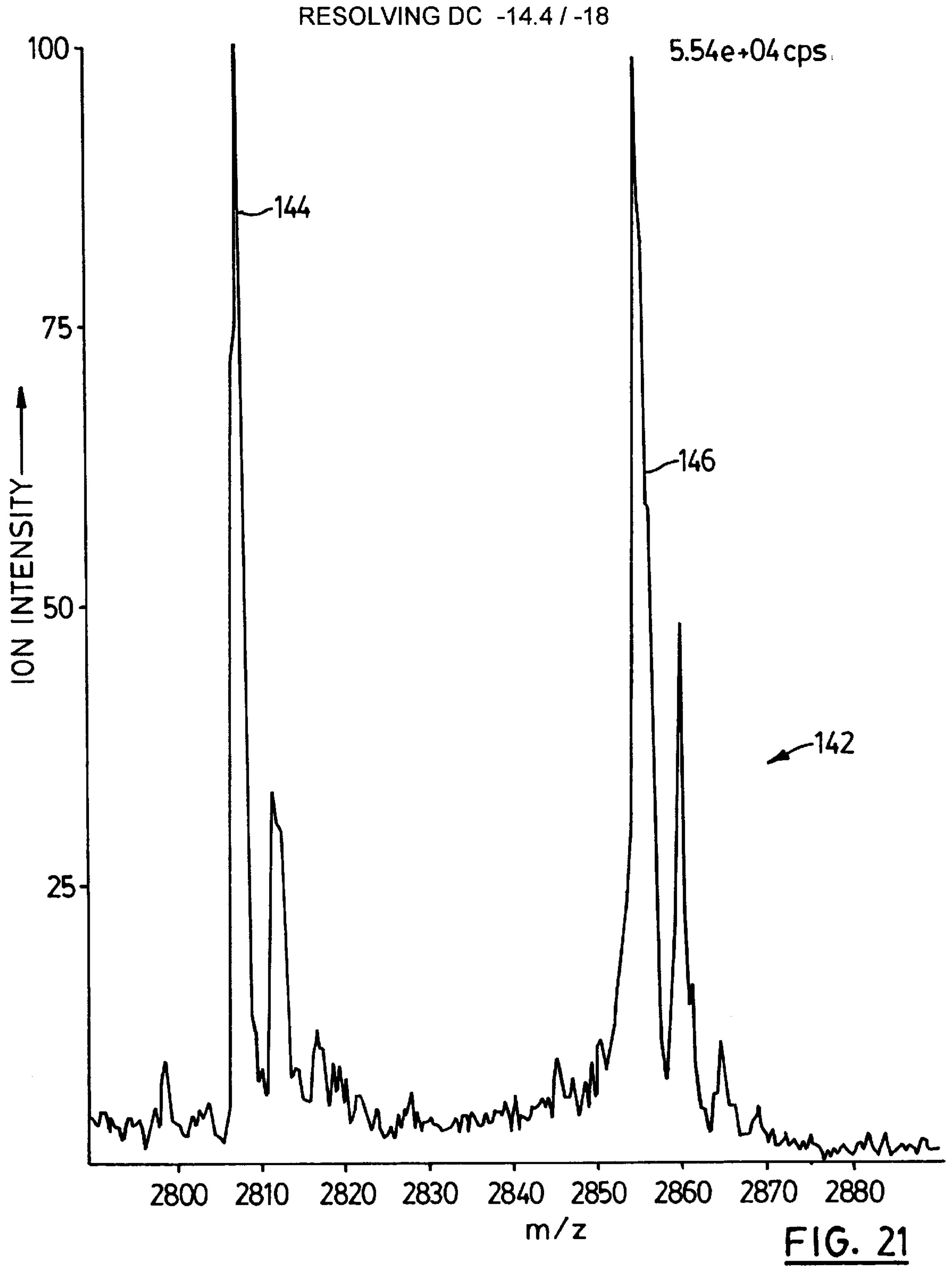
FIG. 21 shows a mass spectrum similar to that of FIG. 18 but with a small amount of resolving DC applied.

FIG. 21 shows a mass spectrum 142 for reserpine similar to that of FIG. 18, but with a small amount of resolving DC applied to the rods 32, as described in copending application Ser. No. 60/031,296 filed Nov. 18, 1996 of James Hager and assigned to the assignee of this invention. Typically the resolving DC applied would be not more than about ten percent of the normal resolving DC used in an RF/DC quadrupole. For example if the normal resolving DC level is in the range of about 100 volts, the resolving DC applied to rods 32 would be not more than about 10 volts. It will be seen that the resolving DC did not affect the shape or intensity of the peak 144 at m/z 609, although there was a shift in the q, but it vastly improved the resolution of peak 146 at q=0.908, as described in said copending application. However the peak 144 was slightly better resolved than peak 146 and had about the same amplitude.

Figure 22:
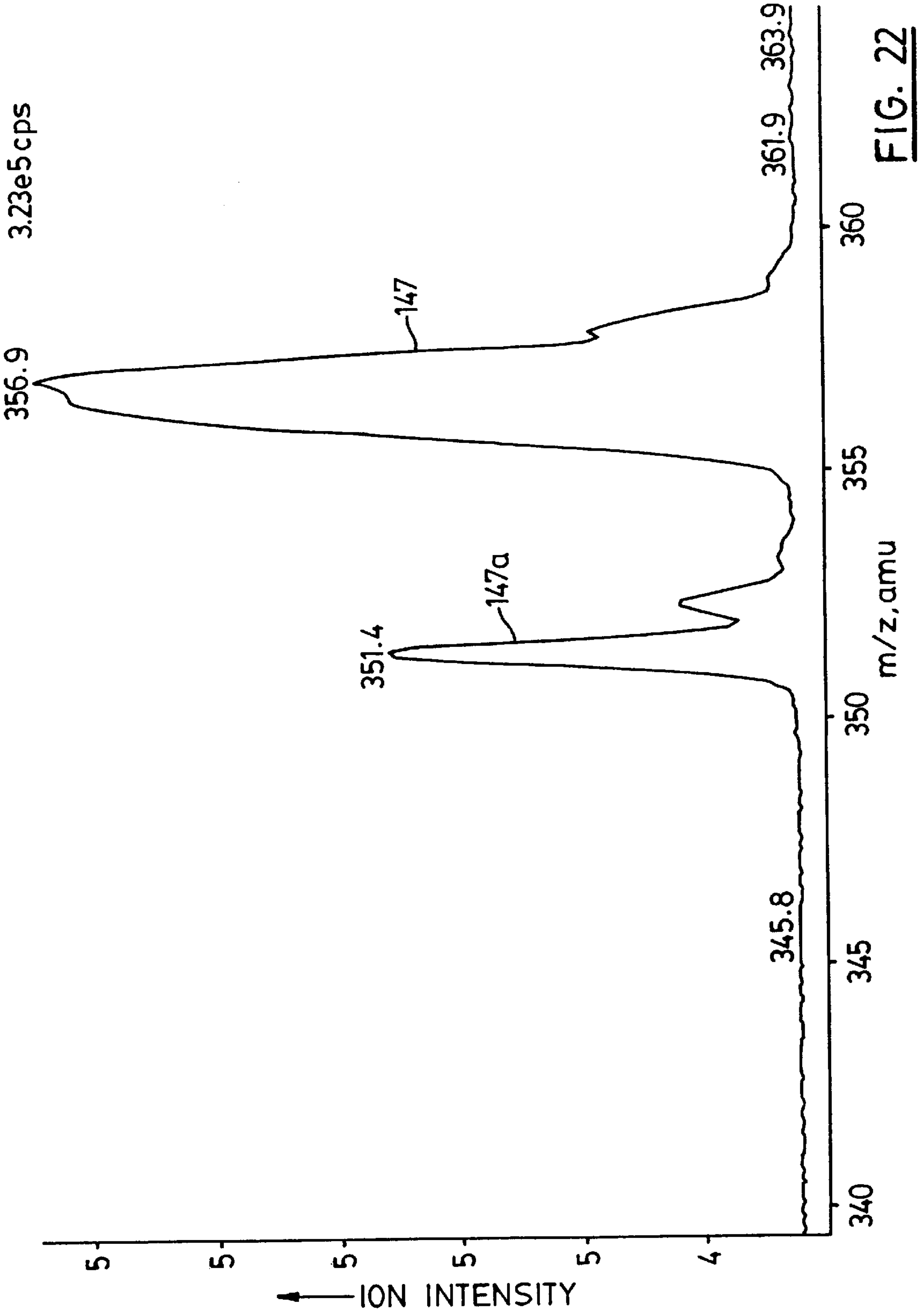
FIG. 22 shows a mass spectrum having peaks at two different values of q.

The excitation mechanism is such that even short rods (2.54 cm) can be used to yield good results, at least at relatively high q. FIG. 22 shows resolution of a quaternary amine at q=0.908 (peak 147) and q=0.89 (peak 147*a*), corresponding respectively to RF-only, and quadrupolar excitation at Ω–2ω, where the drive frequency Ω was 1 MHz and the quadrupolar excitation frequency ω was 120 KHz. While there was some intensity loss in peak 147*a*, the resolution appeared improved over normal RF-only, even though the q was lower.

Figure 23:
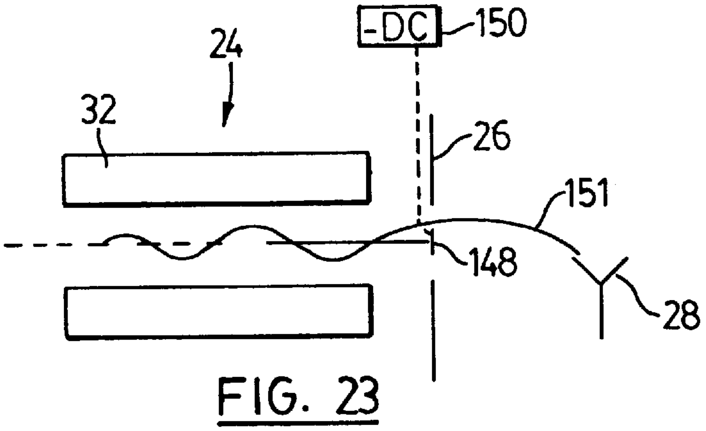
FIG. 23 shows a mass spectrometer according to the invention with an alternative arrangement for discriminating between ions with and without radial excursions.

It will be appreciated that various methods and apparatus may be used to distinguish ions which have been radially excited by the auxiliary excitation (but which have not been rejected) from ions which have not been radially excited. For example, as an alternative to the simple repulsive barrier shown, an accelerating stop 148 may be used, as shown in FIG. 23. In this known technique, an attractive DC voltage (e.g. a negative voltage for positive ions) is placed on stop 148 from voltage source 150. The stop 148 is placed on the axis 14, so that ions which do not have any radial dispersion strike the stop 148, while ions which are radially dispersed pass around the stop 148, as indicated by trajectory 151, and are detected by detector 28.

Figure 24:
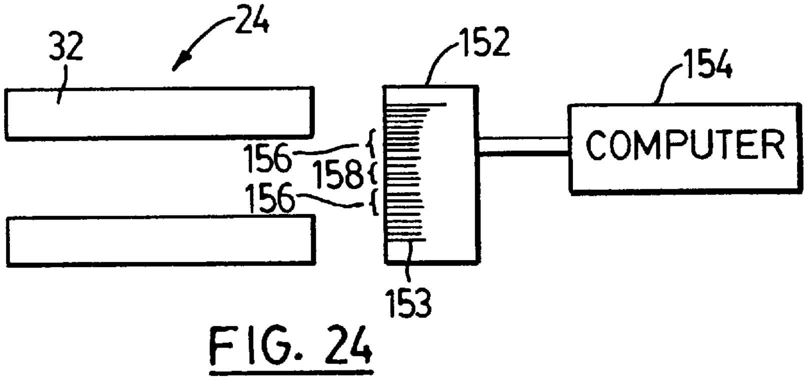
FIG. 24 shows a mass spectrometer according to the invention with still another arrangement for discriminating between ions with and without radial excursions.

Another alternative, as shown in FIG. 24, is to provide a multi-channel detector 152, of the kind made by Galileo and others, which has a number of "pixels" or ion receptor channels 153 spread across the path of the ions. For example, single multi-channel plates having a large array of ion receptor channels are commercially available. The output can be directed to a computer 154 programmed to look at the channels in an annular ring 156 which is off the axis 14, so that only those ions which have been radially excited are detected. Other ions, e.g. those which are in a narrow diameter circle 158 centered on the axis 14, can be ignored or can be detected and analyzed for other purposes (as will be described).

Alternatively, a commercially available detector plate can be used which the ions strike to dislodge photons, which are then detected in conventional manner by a CCD chip (not shown), which chip in turn sends the detected pixels to the computer 154. As before, only those channels of interest are analyzed and those which are to be excluded are ignored in the analysis.

In principle, very low values of q are preferred (e.g. less than about 0.7, preferably less than 0.5, and preferably less than 0.2, e.g. between 0.1 and 0.2), to obtain significant mass range extension or a lowered value for V1, or both.

Another alternative is to "dither" or modulate the amplitude or frequency f of the excitation voltage V2, using a modulation circuit 159 (FIG. 2A). A phase sensitive circuit 159*a* (FIG. 1) is connected to detector 28 and is also connected to modulation circuit 159, so that it selects only the ions specifically excited (i.e. which bear the modulation applied), which are then processed by computer 29. Similar modulation techniques for RF-only quadrupoles at q=0.908 have been described by several workers including Weaver and Mathers, Dyn. Mass Spectrom. J. (1978) 41.

Figure 25:
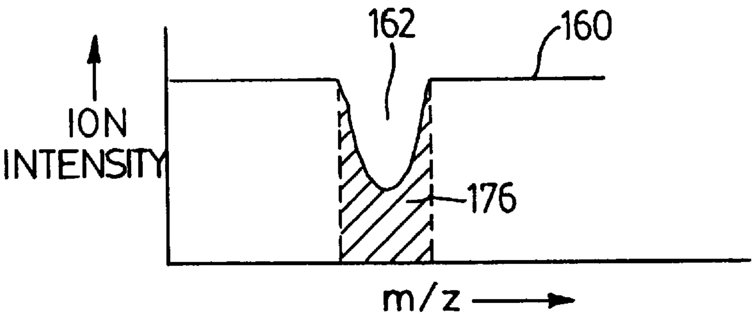
FIG. 25 shows diagrammatically a conventional mass spectrum obtained using a standard notch filter.

Reference is next made to FIG. 25, which shows a further aspect of the invention. FIG. 25 shows diagrammatically a mass spectrum 160 produced by a mass spectrometer such as quadrupole 24, having a dipole or quadrupole auxiliary excitation voltage V2 applied thereto to produce a notch 162 in the spectrum. As previously described, the notch 162 represents ions which have been energized and caused to have radial excursions sufficient to strike the rods, so that they are rejected (i.e. not transmitted). The notch 162 is detected at the axial exit of the rods 32.

Figure 26:
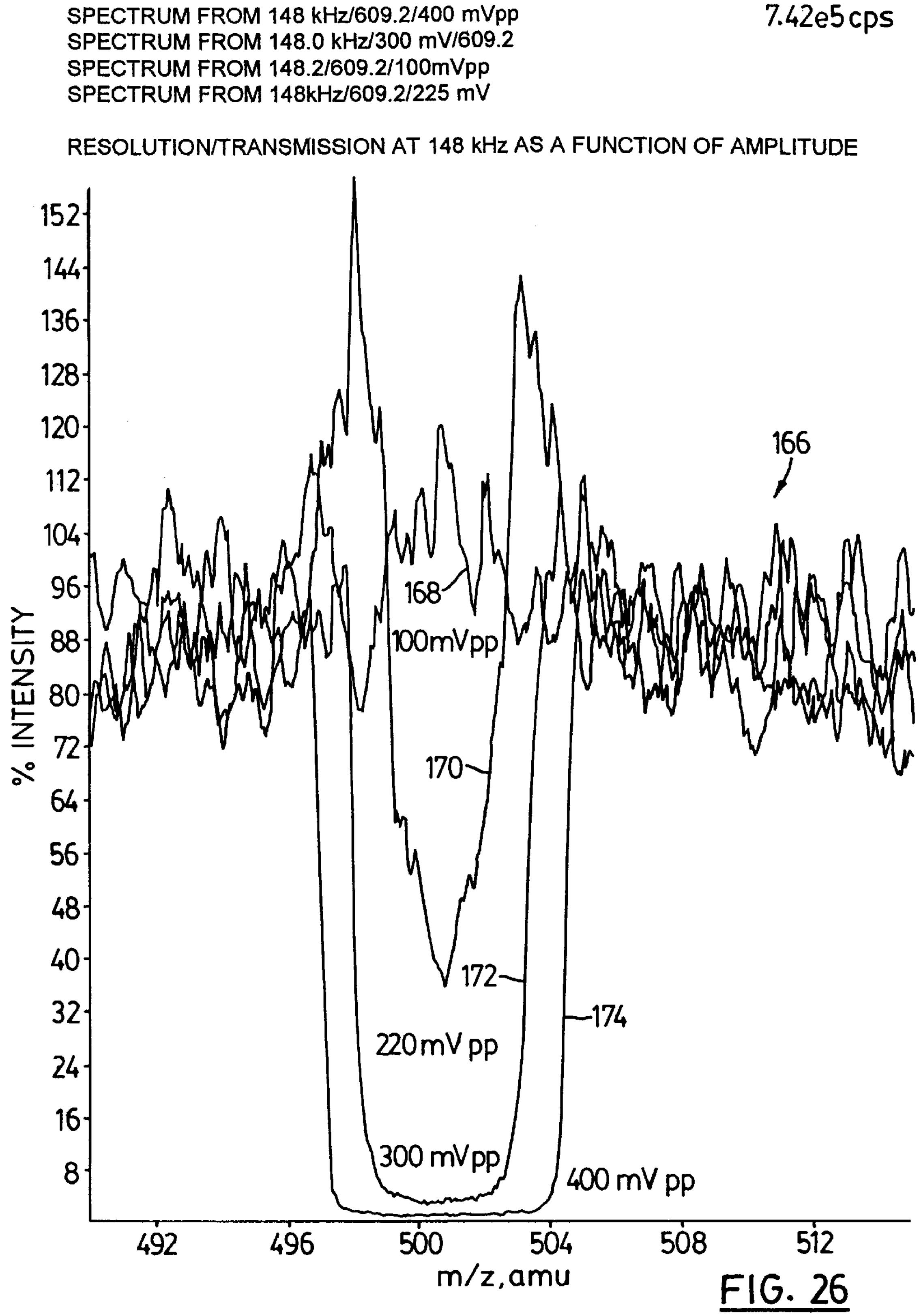
FIG. 26 shows a mass spectrum having different notches therein achieved by different levels of standard notch filtering.

As indicated in FIG. 26, it is difficult to produce an efficient notch filter with good resolution, even with well defined initial conditions, because at the high amplitudes required to radially eject the ions, neighboring values of q can also be excited. This is particularly true for low values of q, where the secular frequencies of the ions are closer together. FIG. 26 shows a set of mass spectra 166 (actually four spectra) having four notches 168, 170, 172, 174, one for each spectrum. The notches were produced with auxiliary excitation voltage V2 set at 100 millivolts peak to peak, 220 millivolts peak to peak, 300 millivolts peak to peak and 400 millivolts peak to peak respectively.

It will be seen that notch 168 (V2=100 millivolts peak to peak) was of negligible depth. Notch 170 (V2=220 millivolts peak to peak) was relatively narrow (about 3 amu) but was not particularly deep. Curves 172, 174 (V2=300 and 400 mV pp respectively) were relatively deep, rejecting virtually all ions within their width, but were quite wide and therefore had poor resolution.

It will be realized, as previously discussed, that in FIG. 25 the shaded area 176 (FIG. 24) beneath the notch 162 represents ions which were energized but did not acquire sufficient radial amplitude to strike the rods and be rejected. These ions, although radially disturbed, were transmitted. If these ions, in addition to those which were energized and struck the rods, can be discriminated against, then the resultant notch would have good resolution but would be efficient in terms of rejecting all ions in the mass range to be excluded. In other words, only those ions would be detected which neither (a) struck the rods, nor (b) were energized but transmitted in any event.

Figure 27:
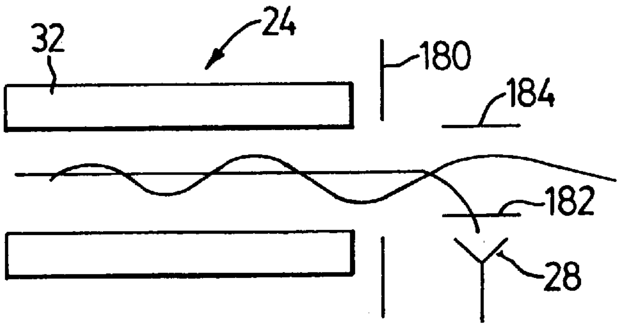
FIG. 27 shows a mass spectrometer according to the invention having an arrangement for improved notch filtering.

This objective can be achieved by detecting for analysis only ions which did not acquire radial excursions, and by rejecting from the analysis ions which received radial disturbances. One way of accomplishing this is to use the apparatus shown in FIG. 24, i.e. by analyzing (using computer 154) only the ions in the narrow circle 158 about the axis 14, and by rejecting for analysis all other ions. A second method is to use the apparatus shown in FIG. 27, where (for example) a lens 180 with a low voltage DC thereon provides an attractive potential drawing the ions from quadrupole 24. Ions which are on the axis 14 and therefore have a lower axial kinetic energy are deflected by deflection grids 182, 184 (to which are applied small negative and positive voltages respectively) and are detected by detector 28. Ions which are off axis and which therefore have a higher axial kinetic energy are more difficult to deflect and therefore do not enter the detector 28.

Figure 28:
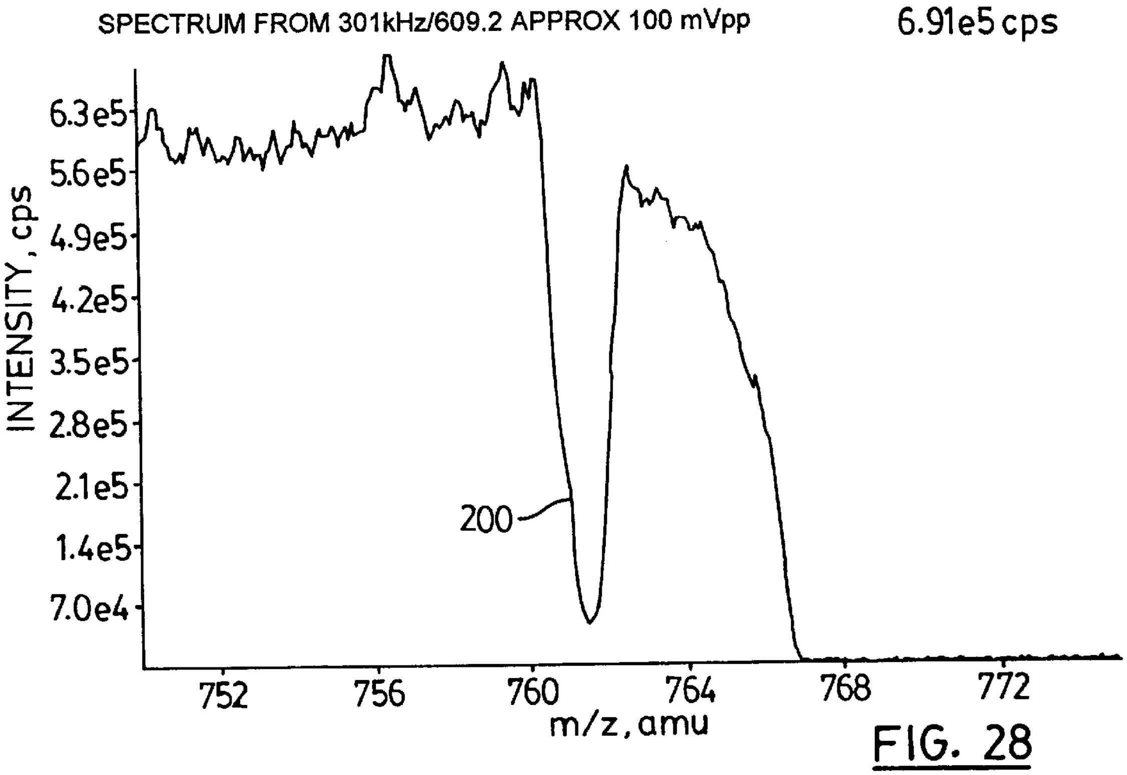
FIG. 28 shows a mass spectrum having a notch therein achieved with the use of the invention.
Figure 29:
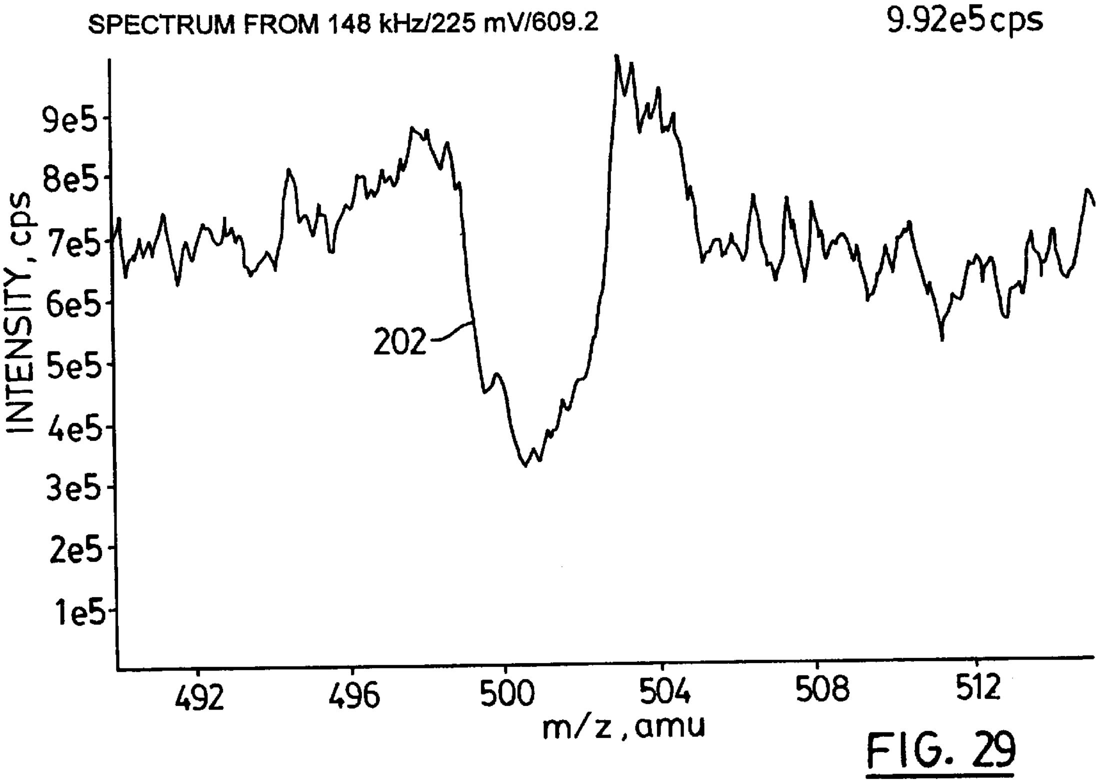
FIG. 29 shows a mass spectrum similar to that of FIG. 28 but achieved at a lower q.

As mentioned earlier, it is in general found that a sharper notch can be produced at a higher q than at a low q. FIG. 28 illustrates the notch 200 produced at a q=0.85, and which notch is about 1 amu wide. Quadrupolar excitation of about 100 millivolts peak to peak was used. FIG. 29 shows a mass spectrum similar to that of FIG. 26 but with q=0.56. It will be seen that the resultant notch 202 produced is less deep, and is wider (about 3 amu in width).

It is found that if the auxiliary excitation voltage V2 is phase locked to the main drive voltage V1, a small improvement in the mass spectrum is obtained in some cases.

While preferred embodiments of the invention have been disclosed, it will be understood that various changes may be made as will be understood by those skilled in the art.

I claim:

1. A method of operating a multipole mass spectrometer having an entrance end and an exit end and having a plurality of pairs of rod-like electrodes extending along an axis, comprising:

(a) supplying ions into the entrance end of the mass spectrometer (b) applying an RF drive voltage to said pairs of rods, while applying either no DC drive voltage or a very low DC drive voltage to said pairs of rods, to generate a substantially RF-only field in which a range of ion masses is stable and pass through said spectrometer while other ion masses are rejected, (c) applying an auxiliary RF voltage to said rods at a selected q to radially excite ions which are in resonance with said auxiliary RF field but at an amplitude low enough that a plurality of such excited ions do not strike said electrodes but instead are transmitted through said spectrometer, (d) at the exit end of the mass spectrometer, for ions that have been transmitted through the mass spectrometer, discriminating between said plurality of excited ions and other ions; and (e) detecting and analyzing at least some of said plurality of excited ions.

2. A method according to claim 1 wherein said selected q is less than about 0.9.

3. A method according to claim 1 wherein said spectrometer is a quadrupole mass spectrometer.

4. A method according to claim 1 wherein ions entering said mass spectrometer have a low energy dispersion.

5. A method according to claim 4 wherein said ions, before entering said spectrometer, pass through a further spectrometer containing a gas therein to collisionally focus said ions and to reduce their energy dispersion and axial energy.

6. A method according to claim 1 wherein said step of discriminating between said plurality of excited ions and other ions comprises providing an energy barrier which allows ions having axial kinetic energy above a selected kinetic axial energy to pass and which blocks ions having axial kinetic energy below said selected axial kinetic energy.

7. A method according to claim 1 wherein said step of discriminating between said plurality of excited ions and said other ions comprises detecting said excited ions by their radial dispersion from said central axis.

8. A method according to claim 1 wherein said auxiliary RF voltage is a dipole voltage.

9. A method according to claim 1 wherein said auxiliary RF voltage is a quadrupole voltage.

10. A method according to claim 1 wherein said plurality of excited ions produce a mass spectrum peak, and wherein said auxiliary RF voltage is at a level sufficient to produce a notch in at least a portion of said peak.

11. A method according to claim 10 wherein said peak has a pair of side peaks, one on each side of said notch therein.

12. A method according to claim 1 wherein q is less than about 0.5.

13. A method according to claim 1 wherein q is less than or equal to about 0.2.

14. A method according to claim 1 wherein substantially no DC drive voltage is applied to said mass spectrometer.

15. A multipole mass spectrometer having a plurality of rod-like electrodes arranged in pairs in parallel about a longitudinal central axis to project between said rods in the axial direction a beam of ions to be analyzed, said spectrometer having an exit end, a detector adjacent said exit end to detect ions which are transmitted through said electrodes, said spectrometer comprising:

(a) an RF drive voltage source for applying an RF drive voltage between pairs of said electrodes to generate an RF field in which a selected range of ion masses are stable and pass through said rods and other ion masses are rejected by becoming unstable, (b) an auxiliary RF drive source for generating an auxiliary RF field having a selected q, for exciting selected ions which are in resonance with said auxiliary RF field to cause a plurality of said selected ions to experience radial excursions of amplitude insufficient to strike said rods, so that said plurality of excited ions are transmitted through said rods, (c) a discriminator for selecting excited ions at said exit end from other ions at said exit end, (d) and a detector for detecting such selected excited ions.

16. Apparatus according to claim 15 wherein said spectrometer is a quadrupole mass spectrometer.

17. Apparatus according to claim 15 wherein said discriminator comprises an energy barrier.

18. Apparatus according to claim 15 wherein said discriminator comprises a multi-channel device responsive to the radial position of ions.

19. Apparatus according to claim 15 wherein said auxiliary RF drive generator provides dipolar excitation.

20. Apparatus according to claim 15 wherein said auxiliary RF drive generator provides quadrupolar excitation.

21. Apparatus according to claim 15 wherein said auxiliary RF drive source includes means for modulating said auxiliary RF fields for producing excited ions having modulated excitation, and said discriminator includes means for selecting ions having said modulated excitation.

22. Apparatus according to claim 15 wherein said apparatus is adapted to produce a mass spectrum having a peak representing said selected excited ions, and wherein the level of said auxiliary RF field is sufficient to produce a notch in said peak.

23. Apparatus according to claim 15 wherein said auxiliary RF drive generator includes means for operating said auxiliary RF field at a q of less than 0.7.

24. Apparatus according to claim 15 wherein said auxiliary RF drive generator includes means for operating said auxiliary RF field at a q of less than or equal to 0.5.

25. Apparatus according to claim 15 wherein said auxiliary RF drive generator includes means for operating said auxiliary RF field at a q of less than or equal to 0.2.

26. A method of operating a rod type multipole mass spectrometer having an entrance end and an exit end, and having a plurality of rod-like electrodes comprising:

(a) supplying ions into the entrance end of the mass spectrometer;

(b) applying an RF drive voltage to said mass spectrometer to generate an RF field in which a range of ion masses are stable and pass through said spectrometer, (c) applying an auxiliary RF voltage to said electrodes to radially excite ions to strike said electrodes and causing a plurality of said radially excited ions to have radial excursions insufficient to strike said electrodes so that said plurality of excited ions are transmitted through said electrodes, (d) at the exit end of the mass spectrometer, for ions that have been transmitted through the mass spectrometer, discriminating between said plurality of excited and other ions; and (e) detecting for analysis substantially only other ions which neither strike said electrodes nor were energized by said auxiliary RF voltage.

27. A method according to claim 26 wherein said auxiliary RF voltage is a dipole voltage.

28. A method according to claim 26 wherein said auxiliary RF voltage is a quadrupolar voltage.

29. A method according to claim 26 wherein said spectrometer has an exit end, said excited ions have a greater axial kinetic energy at said exit end than other ions, and wherein said other ions are selected from said radially excited ions by the differences in axial kinetic energy therebetween.

30. A method according to claim 26 wherein said spectrometer has an axis, said excited ions have radial dispersion off the axis of said spectrometer and other ions are on or adjacent to said axis, and said other ions are selected by their position on or adjacent to said axis.

* * * * *